(12) United States Patent
Matsukura

(10) Patent No.: US 7,668,940 B2
(45) Date of Patent: *Feb. 23, 2010

(54) COMPUTER NETWORK SYSTEM AND PORTABLE COMPUTER SELECTING FROM A PLURALITY OF HARDWARE OR SOFTWARE

(75) Inventor: Ryuichi Matsukura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/865,872

(22) Filed: Jun. 14, 2004

(65) Prior Publication Data

US 2004/0249909 A1    Dec. 9, 2004

Related U.S. Application Data

(62) Division of application No. 09/017,329, filed on Feb. 2, 1998, now Pat. No. 7,519,697.

(30) Foreign Application Priority Data

Aug. 20, 1997    (JP)    .................................... 9-224132

(51) Int. Cl.
    *G06F 15/16*    (2006.01)
(52) U.S. Cl. ........................................ 709/220; 709/223
(58) Field of Classification Search ................ 709/221, 709/228, 220, 223; 358/1.15, 400, 1.13
    See application file for complete search history.

(56) References Cited

U.S. PATENT DOCUMENTS

| | | | |
|---|---|---|---|
| 5,134,697 A | 7/1992 | Scheffler | |
| 5,331,634 A | 7/1994 | Fischer | |
| 5,369,778 A | 11/1994 | San Soucie et al. | |
| 5,371,734 A | 12/1994 | Fischer | |
| 5,485,634 A * | 1/1996 | Weiser et al. | ................ 455/507 |
| 5,548,722 A * | 8/1996 | Jalalian et al. | .............. 709/220 |

(Continued)

FOREIGN PATENT DOCUMENTS

JP    5-37537    2/1993

(Continued)

OTHER PUBLICATIONS

Gupta, V. et al., "The design and deployment of a mobility supporting network", IEEE Second International Symposium on Parallel Architectures, Algorithms, and Networks, pp. 228-234, Jun. 1996.

*Primary Examiner*—Patrice Winder
(74) *Attorney, Agent, or Firm*—Staas & Halsey LLP

(57) ABSTRACT

A computer network system in which an IP address is assigned not only automatically at a destination of a notebook size PC (portable personal computer) 4, but also information relating to shared resources on the network is obtained at the site from a server 1 through a LAN circuit 2, so that the notebook size PC 4 can be used by connecting to the network even in the absence of the administrator. Henceforth, when the user moves within the same building as his own office, it seems that the occasion of using the portable personal computer by connecting to the network such as the Internet and intranet increases. In such a case, connection and disconnection of the network may be repeated frequently, and setting for such operation is facilitated.

12 Claims, 21 Drawing Sheets

| TYPE | NAME | FEATURE | PLACE | USABLE CONDITION | ACCESS CONDITION |
|---|---|---|---|---|---|
| PRINTER | MONOCHROMATIC PRINTER No.1 | 600dpi | MEETING ROOM | Windows 3.1/95 | NONE |
| PRINTER | COLOR PRINTER No.1 | COLOR | SOUTH OF OFFICE | All | NONE |
| PRINTER | MONOCHROMATIC PRINTER No.2 | 600dpi | NORTH OF OFFICE | Windows 3.1/95 | REGISTERED ONLY |
| F D | SERVER 1 | 3.5IN. | SOUTH OF OFFICE | Windows 3.1/95 | NONE |
| CD-ROM | SERVER 1 | 10x | SOUTH OF OFFICE | Windows 3.1/95 | NONE |
| M O | SERVER 1 | 640MB | SOUTH OF OFFICE | Windows 3.1/95 | NONE |
| | | | | | |

| | CONNECTED RESOURCE | REPLACE |
|---|---|---|
| DRIVE A | FDD (DOCKING STATION) | O K |
| DRIVE B | | |
| DRIVE C | BUILT-IN HD | |
| DRIVE D | CDD (DOCKING STATION) | O K |
| DRIVE E | MDD (DOCKING STATION) | O K |
| DRIVE F | NETWORK DRIVE No.1 | O K |
| LPT 1 | PRINTER | |
| COM 1 | | |
| COM 2 | | |
| PRINTER PORT No.1 | 600dpi PRINTER | O K |
| PRINTER PORT No.2 | COLOR PRINTER | O K |

U.S. PATENT DOCUMENTS

| | | | |
|---|---|---|---|
| 5,555,376 A * | 9/1996 | Theimer et al. ............. | 709/229 |
| 5,581,261 A | 12/1996 | Hickman et al. | |
| 5,630,081 A | 5/1997 | Rybicki et al. | |
| 5,642,303 A | 6/1997 | Small et al. | |
| 5,699,495 A * | 12/1997 | Snipp ........................ | 358/1.15 |
| 5,715,395 A | 2/1998 | Brabson et al. | |
| 5,715,461 A | 2/1998 | Yoshitomi | |
| 5,740,422 A | 4/1998 | Foltz et al. | |
| 5,761,669 A | 6/1998 | Montague et al. | |
| 5,781,536 A | 7/1998 | Ahmadi et al. | |
| 5,790,809 A | 8/1998 | Holmes | |
| 5,809,265 A * | 9/1998 | Blair et al. .................. | 715/764 |
| 5,812,865 A | 9/1998 | Theimer et al. | |
| 5,812,932 A | 9/1998 | Wiedeman et al. | |
| 5,819,044 A | 10/1998 | Kawabe et al. | |
| 5,825,759 A | 10/1998 | Liu | |
| 5,835,720 A | 11/1998 | Nelson et al. | |
| 5,857,076 A | 1/1999 | Schmidt | |
| 5,872,961 A | 2/1999 | Sakuma | |
| 5,893,116 A | 4/1999 | Simmonds et al. | |
| 5,911,143 A | 6/1999 | Deinhart et al. | |
| 5,914,955 A | 6/1999 | Rostoker et al. | |
| 5,918,016 A | 6/1999 | Brewer et al. | |
| 5,937,388 A | 8/1999 | Davis et al. | |
| 5,950,198 A | 9/1999 | Falls et al. | |
| 5,957,985 A | 9/1999 | Wong et al. | |
| 5,968,121 A | 10/1999 | Logan et al. | |
| 5,991,846 A | 11/1999 | Ooki | |
| 6,003,068 A | 12/1999 | Sopko | |
| 6,012,083 A * | 1/2000 | Savitzky et al. ............. | 709/202 |
| 6,020,973 A | 2/2000 | Levine et al. | |
| 6,026,403 A | 2/2000 | Siefert | |
| 6,088,120 A | 7/2000 | Shibusawa et al. | |
| 6,115,611 A | 9/2000 | Kimoto et al. | |
| 6,157,925 A | 12/2000 | Jenkins et al. | |
| 6,178,337 B1 | 1/2001 | Spartz et al. | |
| 6,184,998 B1 | 2/2001 | Tebeka | |
| 6,226,783 B1 | 5/2001 | Limondin et al. | |
| 6,241,364 B1 | 6/2001 | Want et al. | |
| 6,246,409 B1 | 6/2001 | Veghte et al. | |
| 6,385,622 B2 | 5/2002 | Bouve et al. | |
| 6,452,692 B1 * | 9/2002 | Yacoub ..................... | 358/1.15 |
| 6,477,581 B1 | 11/2002 | Carpenter et al. | |
| 6,493,104 B1 | 12/2002 | Cromer et al. | |
| 6,552,813 B2 | 4/2003 | Yacoub | |
| 6,623,527 B1 * | 9/2003 | Hamzy ...................... | 715/513 |
| 6,832,223 B1 * | 12/2004 | Scheifler et al. ............... | 707/10 |
| 2003/0097430 A1 * | 5/2003 | Matsukura .................. | 709/221 |
| 2003/0214665 A1 * | 11/2003 | Yamada et al. ............. | 358/1.13 |
| 2004/0249909 A1 * | 12/2004 | Matsukura .................. | 709/221 |

FOREIGN PATENT DOCUMENTS

| | | |
|---|---|---|
| JP | 5-101020 | 4/1993 |
| JP | 6-266600 | 9/1994 |
| JP | 7-154388 | 6/1995 |
| JP | 8-6884 | 1/1996 |
| JP | 8-9450 | 1/1996 |
| JP | 8-87463 | 4/1996 |
| JP | 8-101752 | 4/1996 |
| JP | 8-263418 | 10/1996 |
| JP | 8-305650 | 11/1996 |
| JP | 9-84146 | 3/1997 |
| JP | 10-63445 | 3/1998 |
| JP | 10-69451 | 3/1998 |

* cited by examiner

FIG. 2

| TYPE | NAME | FEATURE | PLACE | USABLE CONDITION | ACCESS CONDITION |
|---|---|---|---|---|---|
| PRINTER | MONOCHROMATIC PRINTER No. 1 | 600dpi | MEETING ROOM | Windows 3.1/95 | NONE |
| PRINTER | COLOR PRINTER No. 1 | COLOR | SOUTH OF OFFICE | All | NONE |
| PRINTER | MONOCHROMATIC PRINTER No. 2 | 600dpi | NORTH OF OFFICE | Windows 3.1/95 | REGISTERED ONLY |
| SW | SEARCH SW | | MEETING ROOM | Windows 3.1/95 | NONE |

FIG. 8

| TYPE | NAME | FEATURE | PLACE | USABLE CONDITION | ACCESS CONDITION |
|---|---|---|---|---|---|
| PRINTER | MONOCHROMATIC PRINTER No.1 | 600dpi | MEETING ROOM | Windows 3.1/95 | NONE |
| PRINTER | COLOR PRINTER No.1 | COLOR | SOUTH OF OFFICE | All | NONE |
| PRINTER | MONOCHROMATIC PRINTER No.2 | 600dpi | NORTH OF OFFICE | Windows 3.1/95 | REGISTERED ONLY |
| FD | SERVER 1 | 3.5IN. | SOUTH OF OFFICE | Windows 3.1/95 | NONE |
| CD-ROM | SERVER 1 | 10x | SOUTH OF OFFICE | Windows 3.1/95 | NONE |
| MO | SERVER 1 | 640MB | SOUTH OF OFFICE | Windows 3.1/95 | NONE |
| | | | | | |

FIG. 10

| | CONNECTED RESOURCE | REPLACE |
|---|---|---|
| DRIVE A | FDD (DOCKING STATION) | OK |
| DRIVE B | | |
| DRIVE C | BUILT-IN HD | |
| DRIVE D | CDD (DOCKING STATION) | OK |
| DRIVE E | MDD (DOCKING STATION) | OK |
| DRIVE F | NETWORK DRIVE No.1 | OK |
| LPT 1 | PRINTER | |
| COM 1 | | |
| COM 2 | | |
| PRINTER PORT No.1 | 600dpi PRINTER | OK |
| PRINTER PORT No.2 | COLOR PRINTER | OK |

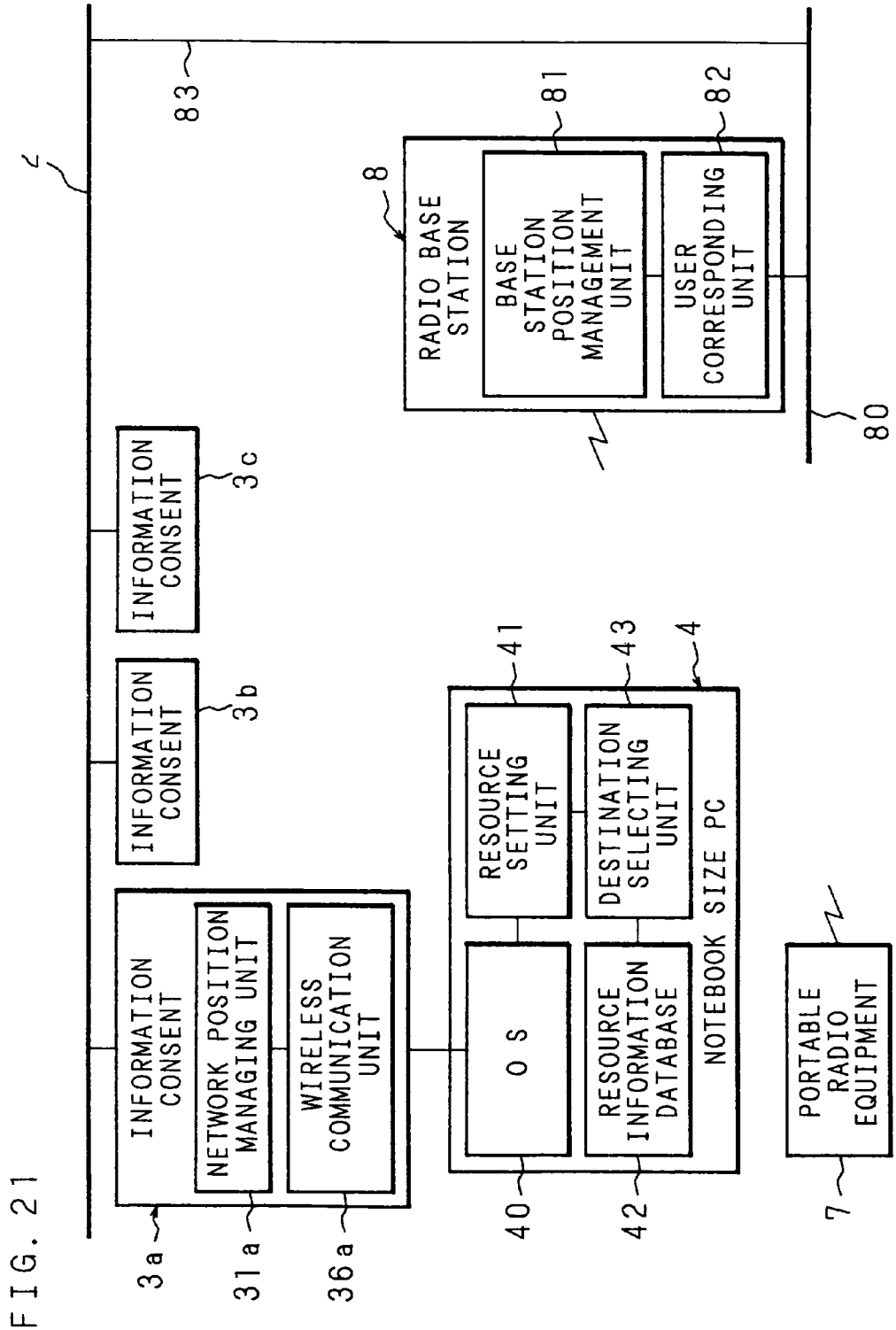

US 7,668,940 B2

COMPUTER NETWORK SYSTEM AND PORTABLE COMPUTER SELECTING FROM A PLURALITY OF HARDWARE OR SOFTWARE

This application is a Division of application Ser. No. 09/017,329, filed Feb. 2, 1998, now issued U.S. Pat. No. 7,519,697 B2.

BACKGROUND OF THE INVENTION

The present invention relates to a mobile computer used by connecting to a network, or mainly a portable computer, and more particularly a network system capable of setting for using the computer system, when such computer is moved to a place requiring change of network setting, if not having prior knowledge about the network environments in that place, by presentation of information for operating adequately in the place from a network server to the moved computer system, and a portable computer used therein.

BRIEF SUMMARY OF THE INVENTION

Recently, small-sized personal computers featuring portability known as notebook size personal computers are widely distributed. In particular, by extending the time driven by a battery, or reducing in thickness and weight for the ease of carrying as the user moves, portable personal computers meeting diversified needs of users are developed, and in actual business scenes, an increasing number of users always carry portable personal computers, and move and use at their destination.

Places where portable personal computers are likely to be used except in the office include the destination of visit, transportation means (train, automobile, airplane, etc.), and hotels, and main jobs in such places are writing of documents or reading of e-mails or the like, and no particular problem occurs. The fact is, however, that use of portable personal computer within the same building as the user's office is not promoted. For example, the user usually connecting the portable personal computer to the network on his own desk in the office does not use it mostly when moving within the same building for meeting or the like. The major reason is that setting of network at the destination is not known.

In such circumstances, henceforth, when the user moves within the same building as the own office, it seems that chances of using the portable personal computer by connecting to the network such as Internet and intranet increase. In such cases, connection and disconnection of the network are frequently repeated, and hence easy setting is desired.

Incidentally, when connecting the portable personal computer to the network in other place than usual as in the cases above, the problem is the setting of the network information. As for the IP (Internet Protocol) address, for example, by installing the DHCP (Dynamic Host Configuration Protocol) in the server, the IP address is assigned automatically in the network in which the server exists, and the portable personal computer can be used immediately by connecting to the network.

In Japanese Patent Application Laid-Open No. 5-101020 (1993) and Japanese Patent Application Laid-Open No. 8-305650 (1996), techniques for assigning automatically the information such as IP address and host name necessary for connecting the computer system to the network are disclosed.

However, all resources connected to the network are not sufficient only when usable. For example, the printer is registered as the resource so that the same printer can be used when the portable personal computer is moved, but in reality it is preferred that the printer closest to the moving destination position of the portable personal computer is usable. That is, the information of such resource as the printer is not usable only by connecting the computer system to a network merely expanding in space, but it must be changed over to a proper resource corresponding to being closer to the moving destination from the usable device, or being same in type or closer in performance as the device used usually.

At a destination to which the user visits for the first time, however, there is no way of knowing how such information is presented which resource in its vicinity, so that it is necessary to ask the people whose usual base of activity is the neighborhood or the administrator of the network. However, when people having such information are happened to be absent at the site, the device cannot be utilized.

Such problem occurs not only in the printer, but also in the flexible disk drive, CD-ROM drive, modem, scanner and other peripheral devices as the portable personal computer further seeks portability, highly depending on the environments at the destination, and it is required to automate the setting procedure, or at least facilitate it.

As the resource, moreover, not only the hardware, but also the software has the same problems. Usually, the user of the portable personal computer installs the software to be used daily in the own portable personal computer, but the software to be used in a certain place only, for example, the software for searching a database usable in one place only is not usually installed in the individual portable personal computer, but in a meeting room, it is effective to install and use in the individual portable personal computers. However, such software has the same problems as in the hardware mentioned above.

Moreover, the same problem is occurred not only in temporary connection of the above-mentioned portable personal computer to a network, but also in semipermanent connection of a desktop personal computer to a network.

The invention is devised in the light of the above background, and is intended to utilize the portable personal computer by connecting to a network even when the administrator is absent, not only by assigning the IP address automatically at the moving destination of the portable personal computer, but also obtaining the information of the shared resource on the network from the server at the site.

Further, by comparing with the daily using environments of the user, it is allowed to use the portable personal computer at the moving destination in the environments closer to the usual environments for the user, thereby avoiding extreme change of the convenience of use.

A first aspect of a computer network system of the present invention is characterized in that plural connecting means capable of connecting and disconnecting a computer is provided in a network circuit to which a first computer has been connected, and a second computer is connected to one of the connecting means, and the first computer comprises resource information managing means for managing information relating to resources usable through the network circuit, and resource information processing means for taking out the content of the resource information managing means in response to a request of information relating to usable resources from other computer, and transmitting to the network circuit, the second computer comprises resource setting means for setting the resource according to the content of the resource information transmitted by the resource information processing means of the first computer, and when the second computer is connected to the network circuit through any one of the plural connecting means, the resource setting means receives the content of the resource information transmitted by the resource information processing means of the first computer and sets the resource.

A second aspect of a computer network system of the present invention is characterized in that plural connecting means capable of connecting and disconnecting a computer is provided in a network circuit to which a first computer has been connected, and a second computer is connected to one of the connecting means, and the first computer comprises resource information managing means for managing information relating to resources usable through the network circuit, resource information processing means for taking out the content of the resource information managing means in response to a request of information relating to usable resources from other computer, and transmitting to the network circuit, and resource installation position managing means for managing the position at which the resource managed by the resource information managing means exists, the second computer comprises position noticing means for noticing the position information indicating the position to the first computer when connected to one of the connecting means, resource selecting means for selecting an arbitrary resource out of plural resources, and resource setting means for setting the resource according to the content of the resource information selected by the resource selecting means, and when the second computer is connected to the network circuit through any one of the plural connecting means, the resource installation position managing means of the first computer reads out the resource information corresponding to the position information noticed by the position noticing means from the resource information managing means, and transmits to the second computer, and the resource setting means of the second computer sets the resource selected by the resource selecting means in the resource information received from the first computer.

A third aspect of a computer network system of the present invention is characterized in that plural connecting means capable of connecting and disconnecting a computer is provided in a network circuit to which a first computer has been connected, and a second computer is connected to one of the connecting means, and the first computer comprises resource information managing means for managing information relating to resources usable through the network circuit, and resource information processing means for taking out the content of the resource information managing means in response to a request of information relating to usable resources from other computer, and transmitting to the network circuit, the second computer comprises resource information holding means for holding the resource information relating to the resources that can be managed directly, and comparing means for comparing the content of the resource information holding means and the content of the resource information managing means of the first computer, and detecting a replaceable resource, and when the second computer is connected to the network circuit through any one of the plural connecting means as being disconnected from the resource that can be managed directly, the comparing means compares the content of the resource information managing means transmitted from the resource information processing means and the content of the resource information holding means, and the resource setting means sets a replaceable resource.

A fourth aspect of a computer network system of the present invention is characterized in that plural connecting means capable of connecting and disconnecting a computer is provided in a network circuit to which a computer is connected to one of the connecting means, and the computer comprises resource information managing means for managing plural sets of information relating to the resources usable through the network circuit corresponding to the connecting means, position selecting means for selecting one of the information relating to plural sets of resources managed by the resource information managing means, and resource setting means for setting the resource according to the information relating to the resource corresponding to the position selected by the position selecting means, and when the computer is connected to the network circuit through any one of the plural connecting means, the resource setting means obtains the resource information corresponding to the position selected by the position selecting means from the resource information managing means, and sets the resource.

A fifth aspect of a computer network system of the present invention is characterized in that plural connecting means capable of connecting and disconnecting a computer is provided in a network circuit to which a first computer has been connected, and a second computer is connected to one of the connecting means, and the first computer comprises resource information managing means for managing plural sets of information relating to resources usable through the network circuit corresponding to plural positions, the second computer comprises resource information managing means for managing plural sets of information relating to the resources usable through the network circuit corresponding to the connecting means, position selecting means for selecting one of the information relating to plural sets of resources managed by the resource information managing means, resource setting means for setting the resource according to the information relating to the resource corresponding to the position selected by the position selecting means, and comparing means for comparing the updated time of the content of the own resource information managing means and the updated time of the content of the resource information managing means of the first computer, and when the second computer is connected to the network circuit through any one of the plural connecting means, the resource setting means obtains the content of the resource information managing means of the first computer, and registers in the resource information managing means in the case where the comparing result by the comparing means shows that the updated time of the content of the own resource information managing means is before the updated time of the content of the resource information managing means of the first computer.

A sixth aspect of a computer network system of the present invention is characterized in that plural connecting means capable of connecting and disconnecting a computer is provided in a network circuit to which a computer is connected to one of the connecting means, and the computer comprises resource information managing means for managing plural sets of information relating to the resources usable through the network circuit corresponding to the connecting means, position selecting means for selecting one of the information relating to plural sets of resources managed by the resource information managing means, resource setting means for setting the resource according to the information relating to the resource corresponding to the position selected by the position selecting means, updated resource information transmitting means for transmitting updated resource information to all computers connected to the network circuit when content of the resource information managing means is updated, and resource information updating means for updating the content of the resource information managing means when receiving the updated resource information, and when the computer is connected to the network circuit through any one of the plural connecting means, the resource information updating means updates the content of the resource information managing means in the case where the resource information updating means receives the updated resource information from the updated resource information transmitting means of other computer.

A seventh aspect of a computer network system of the present invention is characterized in that plural connecting means capable of connecting and disconnecting a computer is provided in a network circuit to which plural first computers have been connected, and a second computer is connected to one of the connecting means, and each of the first computers comprises resource information managing means for managing information relating to a resource installed at a specific position usable through the network circuit, and resource information processing means for taking out the content of the resource information processing means in response to a request of information relating to usable resources from other computer, and transmitting to the network circuit, the second computer comprises position information managing means for managing information relating to the positions of the resources managed by each of the plural first computers, position selecting means for selecting one of the information relating to the positions managed by the position information managing means, resource information obtaining means for obtaining the information relating to the resource corresponding to the position selected by the position selecting means from the first computer managing it, and resource setting means for setting the resource according to the content of the resource information obtained by the resource information obtaining means, and when the second computer is connected to the network circuit through any one of the plural connecting means, the resource information obtaining means obtains the resource information corresponding to the position selected by the position selecting means from the information managed by the position information managing means, and the resource setting means sets the resource.

An eighth aspect of a computer network system of the present invention is characterized in that plural connecting means capable of connecting and disconnecting a computer is provided in a network circuit to which a computer is connected to one of the connecting means, and the computer comprises resource information obtaining means, when other computer is connected to the connecting means of the network circuit, for obtaining the information relating to the usable resources through the network circuit from the other computer, and resource setting means for setting the resource according to the information relating to the resource obtained by the resource information obtaining means, and when the computer is connected to the network circuit through any one of the plural connecting means, the resource setting means sets the resource according to the resource information obtained by the resource information obtaining means from other computer connected to the connecting means of the network circuit.

A ninth aspect of a computer network system of the present invention is characterized in that plural connecting means capable of connecting and disconnecting a computer is provided in a network circuit to which a computer is connected to one of the connecting means, and each of the plural connecting means has position managing means for storing the position information indicating each installation position, the computer comprises resource information managing means for managing plural sets of information relating to the resources usable through the network circuit corresponding to the connecting means, position selecting means for selecting one of the information relating to plural sets of resources managed by the resource information managing means corresponding to the position information stored in the position managing means of the connecting means, and resource setting means for setting the resource according to the information relating to the resource corresponding to the position selected by the position selecting means, and when the computer is connected to the network circuit through any one of the plural connecting means, the resource setting means sets the resource according to the resource information registered in the resource information managing means corresponding to the position information stored in the position information managing means of the connecting means to which the computer is connected.

A tenth aspect of a computer network system of the present invention is characterized in that plural connecting means capable of connecting and disconnecting a computer is provided in a network circuit to which a computer is connected to one of the connecting means, and the connecting means comprises resource information managing means for managing the information relating to the resources usable through the network circuit near each installation position, resource information noticing means for noticing the content of the resource information managing means when the computer system is connected, and updated resource information registering means for updating and registering the content of the resource information managing means by receiving updated resource information from the computer, the computer comprises resource information receiving means for receiving the resource information managed by the resource information managing means noticed by the resource information noticing means, resource setting means for setting the resource according to the resource information received by the resource information receiving means, and updated resource information noticing means for noticing the updated resource information to the connecting means in order to update the content of the resource information managing means of the connecting means, and when the computer is connected to the network circuit through any one of the plural connecting means, the resource information receiving means receives the resource information managed by the resource information managing means noticed from the resource information noticing means, and the resource setting means sets the resource according to the resource information received by the resource information receiving means.

An eleventh aspect of a computer network system of the present invention is characterized in that, in the tenth aspect, the connecting means further comprises updated resource information transmitting means for sending out updated resource information to the network circuit when the content of the resource information managing means is updated, and updated resource information receiving means for updating the content of the resource information managing means when receiving the updated resource information from the network circuit, when updated resource information is noticed from the updated resource information noticing means to the connecting means, the updated resource information transmitting means sends out the updated resource information to the network circuit, and the updated resource information receiving means, when receiving the updated resource information from the network circuit, updates the content of the resource information managing means according to the received updated resource information.

A twelfth aspect of a computer network system of the present invention is characterized in that at least one connecting means capable of connecting and disconnecting a computer is provided in plural network circuits to each of which resource has been connected, and a computer is connected to one of the connecting means, and the resource has resource information replying means for replying the own resource information when receiving a predetermined message, the computer comprises resource request message transmitting means for transmitting a message propagating within one network circuit, resource information receiving means for receiving the resource information, and resource setting means for setting the resource according to the content of the resource information received by the resource information receiving means, and when the computer is connected to the network circuit through any one of the plural connecting means, a predetermined message is transmitted from the resource request message transmitting means, the resource information of the resource replied by the resource information replying means for the predetermined message is received by the resource information receiving means, and the resource is set by the resource setting means.

A thirteenth aspect of a computer network system of the present invention is characterized in that at least one connecting means capable of connecting and disconnecting a computer is provided in plural network circuits to each of which a first computer has been connected, and a second computer is connected to one of the connecting means, and each of the first computers comprises resource information managing means for managing information relating to resources usable through only one network circuit to which each is connected, and resource information replying means for replying the resource information which is the content of the own resource information managing means when receiving the predetermined message, the computer comprises resource request message transmitting means for transmitting a message propagating within one network circuit, resource information receiving means for receiving the resource information, and resource setting means for setting the resource according to the content of the resource information received by the resource information receiving means, and when the computer is connected to the network circuit through any one of the plural connecting means, a predetermined message is transmitted from the resource request message transmitting means, the resource information replied by the resource information replying means of the resource of the first computer to this predetermined message is received by the resource information receiving means, and the resource is set by the resource setting means.

A fourteenth aspect of a computer network system of the present invention is characterized in that plural connecting means capable of connecting and disconnecting a computer is provided in a network circuit to which a computer is connected to one of the connecting means, and each of the plural connecting means comprises position managing means for storing the position information showing each installation position, and radio communication means, the computer comprises resource information managing means for managing plural sets of information relating to resources usable through the network circuit corresponding to the connecting means, radio communication means for connecting with the radio communication means of the connecting means by radio communication, and selecting one of the information relating to plural sets of resources managed by the resource information managing means corresponding to the position information stored in the position managing means of the connecting means, and resource setting means for setting the resource according to the information relating to the resource corresponding to the position selected by the position selecting means, and when the radio communication means of the computer is connected to the radio communication means of any one of the plural connecting means through radio communication, the resource setting means sets the resource according to the resource information registered in the resource information managing means corresponding to the position information stored in the position information managing means of the connecting means to which the radio communication means of the computer is connected.

A fifteenth aspect of a computer network system of the present invention is characterized in that plural connecting means capable of connecting and disconnecting a computer is provided in a network circuit to which a radio base station capable of communicating with a mobile radio communication device is connected, and a computer is connected to one of the connecting means, and the radio base station comprises position information managing means for transmitting the position information for identifying itself to the network circuit when communicating with the mobile radio communication device, and corresponding means for managing by corresponding between the mobile radio communication device and the computer, the computer comprises resource information managing means for managing plural sets of information relating to the resources usable through the network circuit corresponding to the connecting means, position selecting means for selecting one of the information relating to plural sets of resources managed by the resource information managing means according to the position information transmitted from the position managing means of the radio base station, and resource setting means for setting the resource according to the information relating to the resource corresponding to the position selected by the position selecting means, and when the computer is connected to the network circuit through any one of the plural connecting means, the resource setting means sets the resource by obtaining the resource information corresponding to the position selected by the position selecting means from the resource information managing means.

A portable computer of the present invention is used by being connected to a computer network to which a server computer is connected, and comprises: a resource information inquiring unit for inquiring the information relating to the resources usable in the network, to the server computer of the network to which it is connected itself, a resource information obtaining unit for obtaining resource information noticed from the server computer in response to the inquiry from the resource information inquiring unit, and a resource setting unit for setting at least one resource required in the network according to the information relating to the resource obtained by the resource information obtaining unit, wherein the resource setting unit, when connected to a certain network, sets the resource according to the resource information intrinsic to the network obtained by the resource information obtaining unit.

The above and further objects and features of the invention will more fully be apparent from the following detailed description with accompanying drawings.

BRIEF DESCRIPTION OF THE SEVERAL VIEWS OF THE DRAWINGS

FIG. 2 is a schematic diagram showing an example of content of a database of a server;

FIG. 8 is a schematic diagram showing an example of content of a database of a server;

FIG. 10 is a schematic diagram showing setting content of resource information of a client;

FIG. 21 is a block diagram for explaining a fourteenth embodiment of the invention.

DESCRIPTION OF THE PREFERRED EMBODIMENTS

Figure 1:
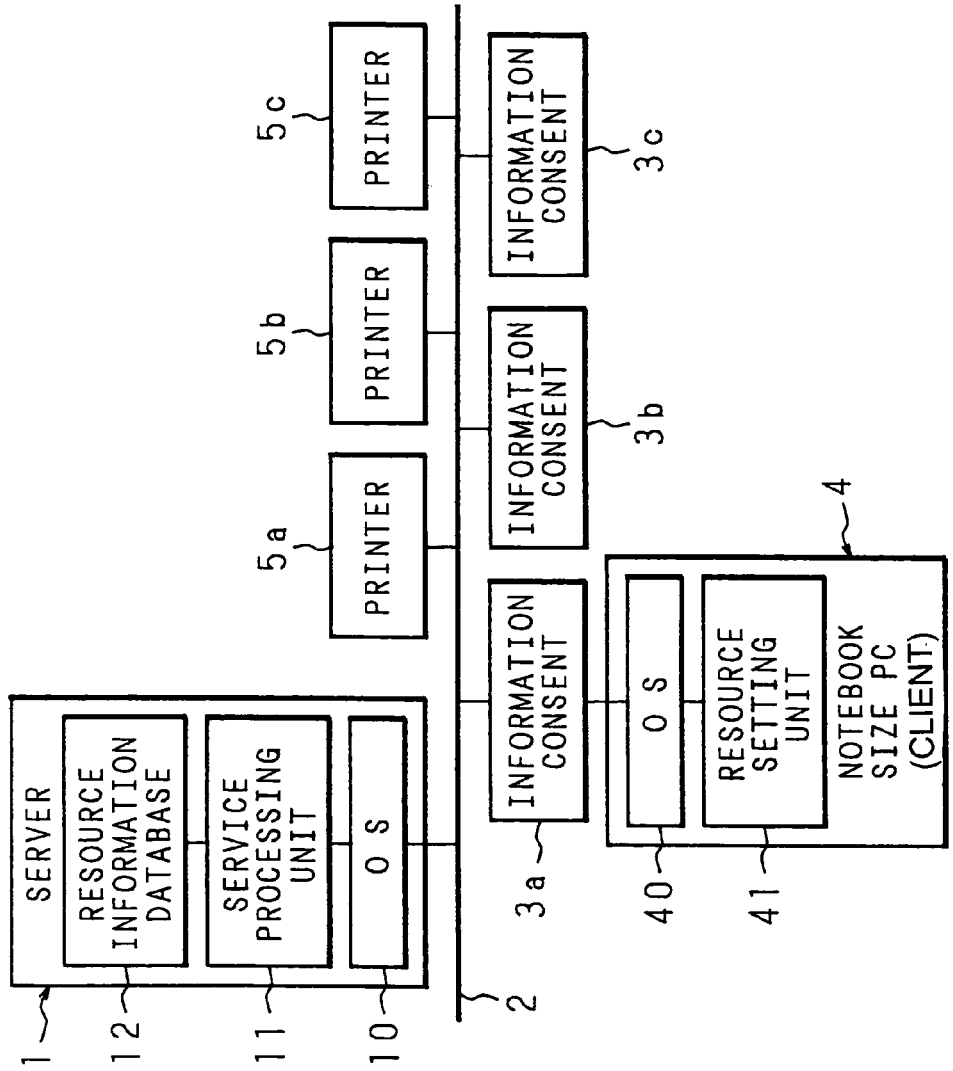
FIG. 1 is a block diagram for explaining a first embodiment of the invention.

Referring now to the drawings, embodiments of the invention are described below. FIG. 1 is an explanatory diagram of a first embodiment of a computer network system according to the invention, also showing a constitution of a portable computer of the invention.

In FIG. 1, reference numeral 2 denotes a LAN circuit, and plural information consents 3a, 3b, 3c, a server 1, and peripheral devices 5a, 5b, 5c are connected thereto. The information consents 3a, 3b, 3c can be freely connected or disconnected by a portable personal computer (hereinafter called a notebook size PC) 4 as a client computer.

The server 1 comprises a server OS 10 and other various necessary products of software, and also has a software function to communicate with a service processing unit 11 and a resource information database 12. The service processing unit 11 processes various services to the notebook size PC 4 as the client computer. The resource information database 12 stores various data relating to shared resources.

The notebook size PC 4 includes client OS 40 and other various necessary products of software, and also includes a resource setting unit 41 as a software function. The resource setting unit 41 of the notebook size PC 4 executes the processing for inquiring the information relating to the resource to the server 1.

As shown in FIG. 1, three printers 5a, 5b, 5c are connected as peripheral devices to the LAN circuit 2. Accordingly, in the resource information database 12 of the server 1, resource information is registered as shown in the schematic diagram in FIG. 2. More specifically, in the resource information database 12, types of peripheral devices (all printers), names on the network (monochromatic printer No. 1, color printer No. 1, monochromatic printer No. 2), their features (600 dpi, color, 600 dpi), places of installation (meeting room, south of office, north of office), usable conditions, that is, OS or hardware conditions (Windows 95, All, Windows 95/3.1), and access conditions (none, none, registered only) are registered.

Further in the server 1, for example, the software for searching a database intrinsic to the network to which the server 1 is connected (hereafter called search software) is installed, and this search software is also registered as resource information as shown in FIG. 2.

Hereinafter is explained a specific case of the user using the notebook size PC 4 by connecting to the LAN circuit 2. First, the user connects his notebook size PC 4 to one of the information consents 3a, 3b, 3c, for example, 3a, and then the resource setting unit 41 of the notebook size PC 4 broadcasts the resource request message to the LAN circuit 2, thereby waiting for a reply. When the service processing unit 11 of the server 1 receives the resource request message broadcasted from the notebook size PC 4, the resource information database 12 is searched, and the resource usable by the notebook size PC 4 is extracted and a list (resource information list) is generated, and this resource information list is transmitted to the LAN circuit 2, being destination to the notebook size PC 4 to which the service processing unit 11 has sent the resource request message.

In the resource information database 12 of the content as shown in FIG. 2, for example, if the user of the notebook size PC 4 connected to the information consent 3a is a user not registered in the network, the service processing unit 11 extracts the resource information relating to the "monochromatic printer No. 1" and "color printer No. 1", other than the "monochromatic printer No. 2" in which "registered person only" is specified as the access condition, and the "search software", and generates a resource information list.

Figure 3:
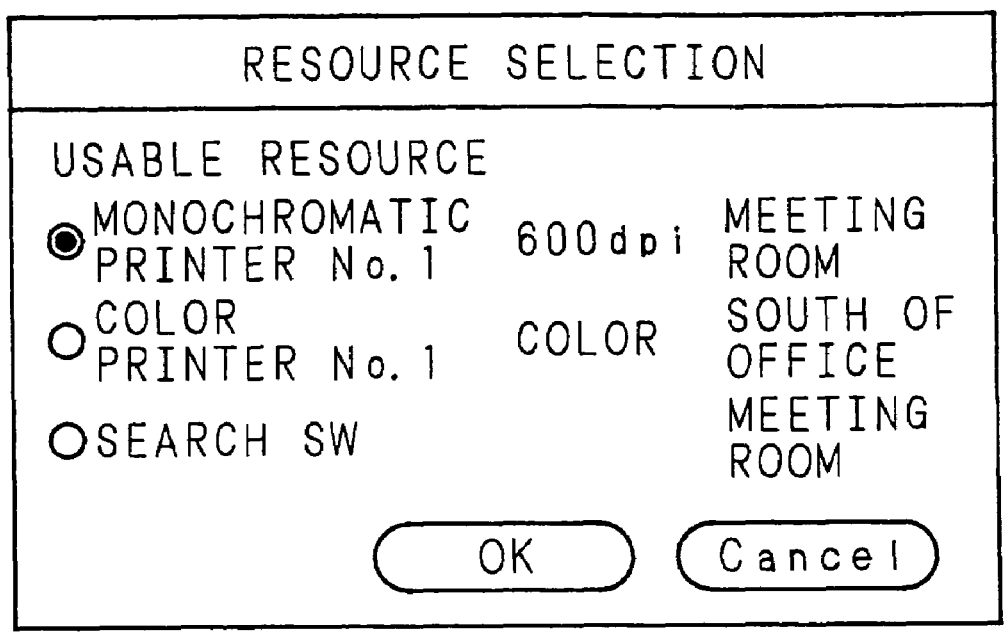
FIG. 3 is a schematic diagram showing a display example of a client computer.

In this way, when the resource information list is transmitted from the server 1 to the LAN circuit 2, it is received by the notebook size PC 4, and is presented in a manner understandable by the user, specifically, shown on a display and like. FIG. 3 is a schematic diagram showing a display example in the notebook size PC 4. In this example, as the usable resources, "monochromatic printer No. 1", "color printer No. 1" and "search SW (software)" are presented, and it is shown that the features of the two printers are 600 dpi and color, respectively, and the places of installation are known to be the meeting room, south of office, and the meeting room, respectively. The user refers to the resource information list presented as in FIG. 3 and selects the resource, and when, for example, "monochromatic printer No. 1" is selected, the resource setting unit 41 sets the client OS 40 so that the selected resource (monochromatic printer No. 1) may be usable in the notebook size PC 4.

When selecting the hardware as the resource, it is possible to use only by setting the resource information as described above, but concerning the software as the resource, it is necessary to download this software into the notebook size PC 4. Therefore, when the user selects the "search software", the resource setting unit 41 of the notebook size PC 4 requests downloading of the selected resource (search software) to the server 1.

In response, the server 1 transmits the software requested by the service processing unit 11, in this case, the program file of the search software to the notebook size PC 4. In the notebook size PC 4, receiving the program file transmitted from the server 1, it is accepted by the resource setting unit 41 and registered in the program menu. Thus, in the notebook size PC 4, it is possible to start the search software registered in the program menu, and the user can use the search software on the notebook size PC 4 in the meeting room.

A second embodiment of the invention is described below. In the first embodiment, of the resource information registered in the resource information database 12 of the server 1, the resource information of all peripheral devices that can be connected to the notebook size PC 4 is transmitted to the notebook size PC 4, but it is also possible to present the place of controlling the resource by the server 1 from the server 1 itself, and designate the place from the notebook size PC 4.

Figure 4:
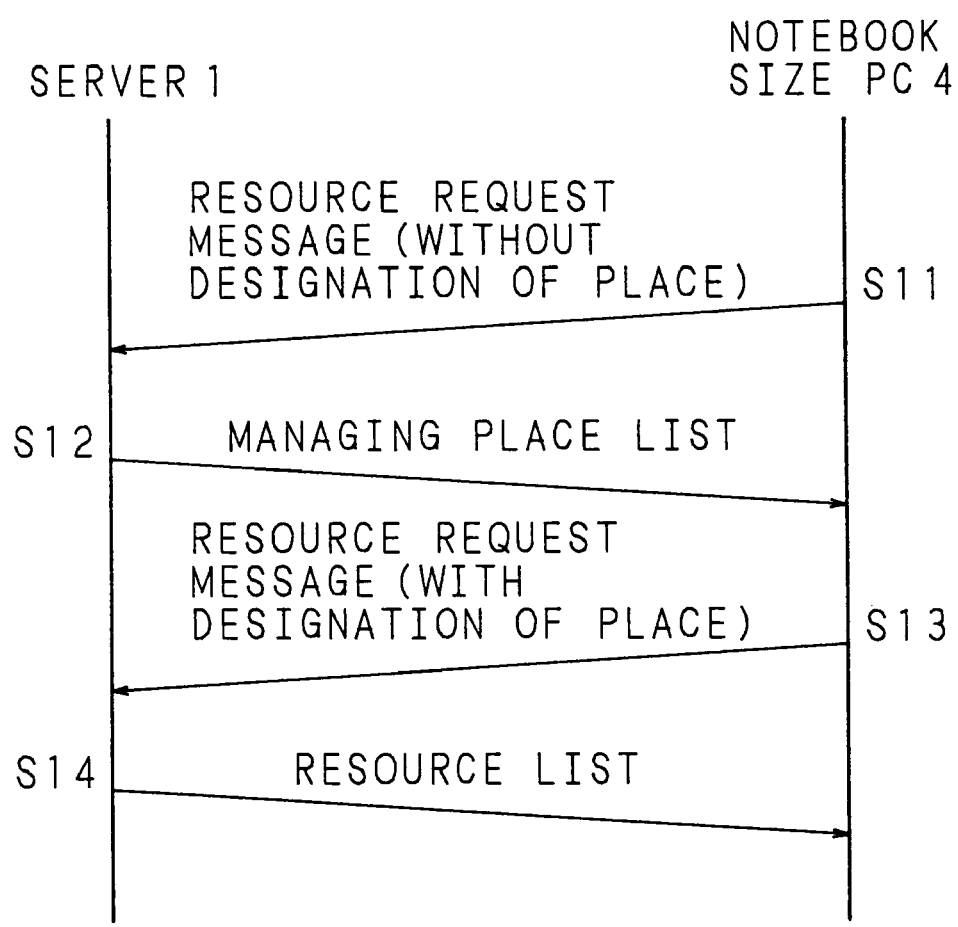
FIG. 4 is a time chart for explaining a second embodiment of the invention.

That is, as shown in the time chart in FIG. 4, first the notebook size PC 4 transmits a resource request message without designation of place to the server 1 (step S11). In response, the server 1 notices the information of the place for managing the resource by the server 1 itself to the notebook size PC 4 as the managing place list (step S12). A menu screen of managing places as schematically shown in FIG. 5 is presented in the notebook size PC 4.

Figure 5:
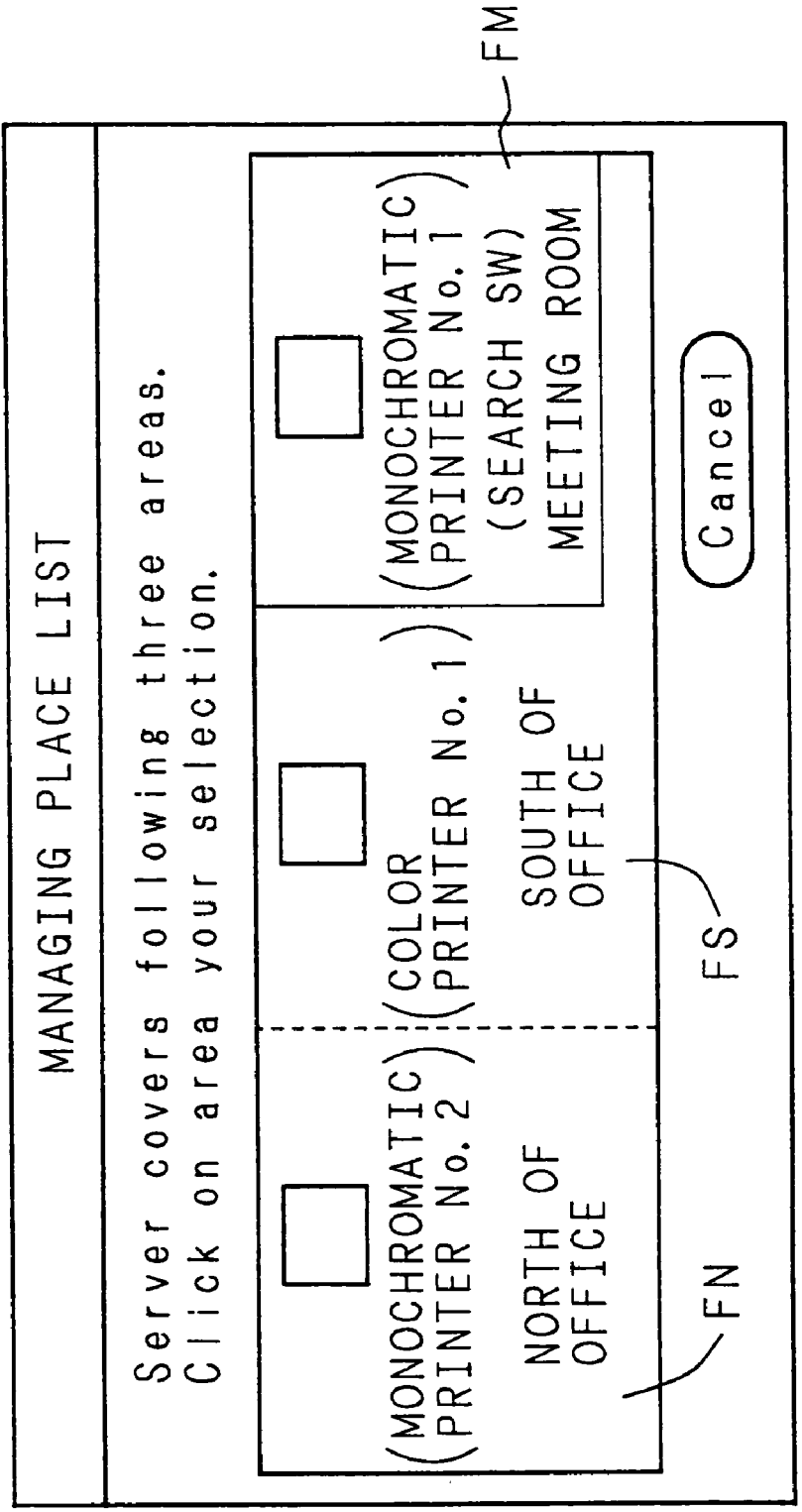
FIG. 5 is a schematic diagram showing a display example of a client computer.

In the example shown in FIG. 5, the server 1 manages three areas, that is, north portion FN and south portion FS of office, and meeting room FM, and it shows, in other words, that the LAN circuit 2 is installed in these three areas. As shown in FIG. 2, the monochromatic printer No. 2 is installed in the north of office FN, a color printer No. 1 in the south of office FS, and monochromatic printer No. 1 in the meeting room FM, and it further shows that the search software is usable in the meeting room FM.

Figure 6A:
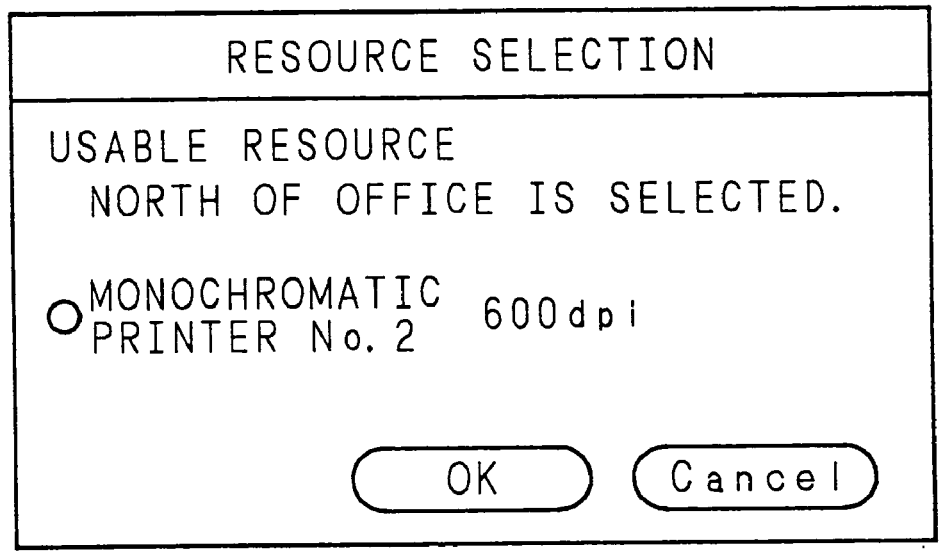
FIG. 6A and FIG. 6B are schematic diagrams showing a display example of a client computer.

When the user of the notebook size PC 4 designates any area, for example, north of office on the menu as shown in FIG. 5, a resource request message with designation of place is transmitted from the notebook size PC 4 to the server 1 (step S13). Receiving this resource request message with designation of place, the server 1 extracts the resource information installed in the designated place, and transmits the list to the notebook size PC 4 (step S14). As a result, the information relating to the resource installed in the north of office FN is presented in the notebook size PC 4. When the server 1 is managing the resource as shown schematically in FIG. 2, "monochromatic printer No. 2" is displayed as a usable resource as shown schematically in FIG. 6A.

Figure 6B:
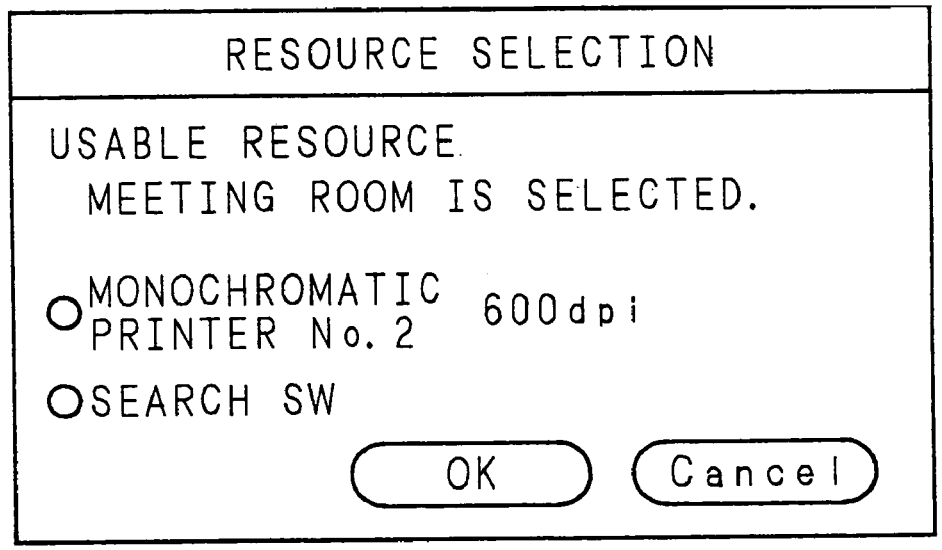

When the user selects the "monochromatic printer No. 2", same as in the foregoing first embodiment, its use is enabled in the notebook size PC 4. Further, when the user selects the "meeting room" on the screen as shown in FIG. 5, the "monochromatic printer No. 1" and "search SW" are displayed as usable resources on the screen as shown in FIG. 6B. When the user selects "search SW" herein, same as in the first embodiment, the program file of the search software is downloaded in the notebook size PC 4 and is usable.

Figure 7:
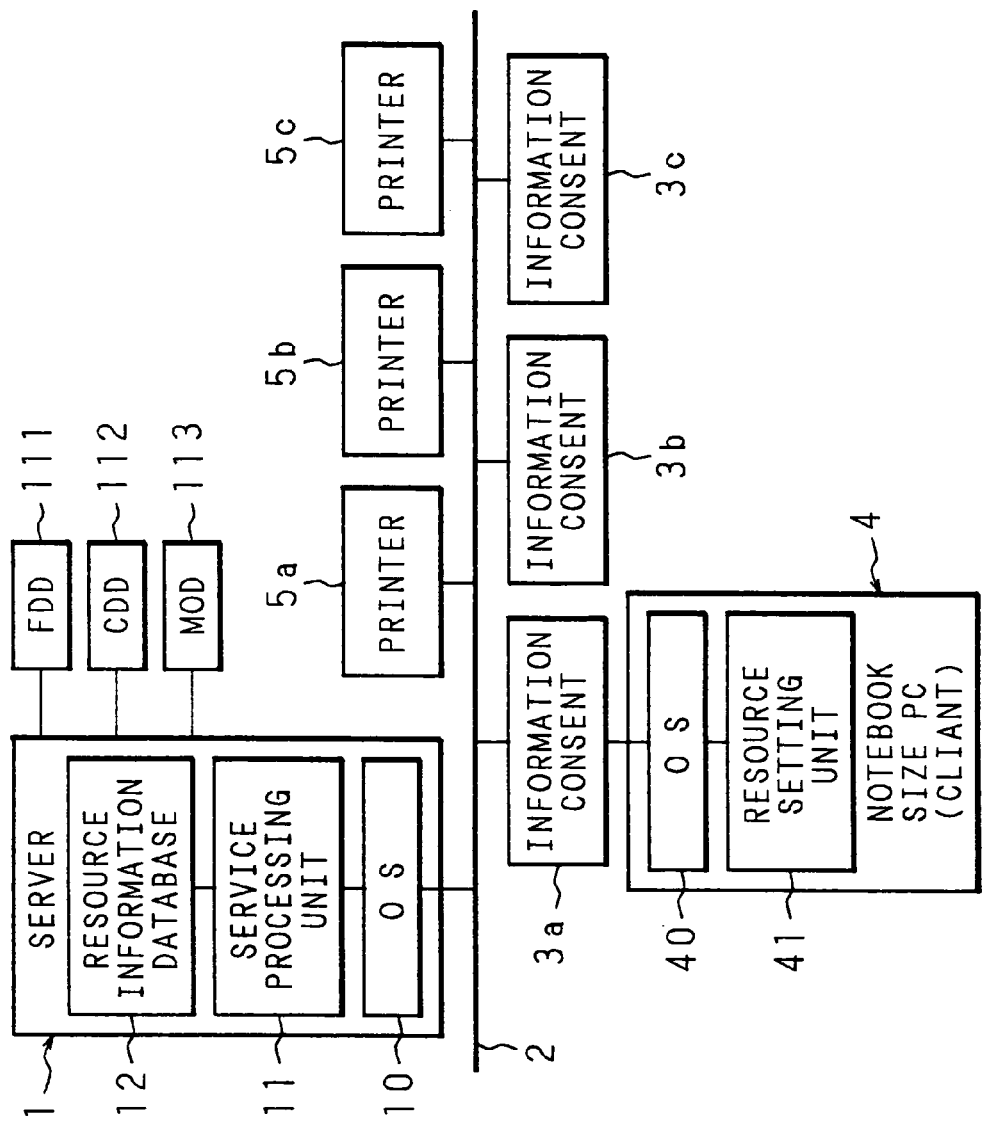
FIG. 7 is a block diagram for explaining a third embodiment of the invention.

FIG. 7 is an explanatory diagram of a third embodiment of the invention.

What the third embodiment shown in FIG. 7 differs from the first embodiment shown in FIG. 1 is that peripheral devices are connected also to the server 1 itself, aside from the peripheral devices connected to the LAN circuit 2. That is, a flexible disk drive (FDD) 111, a CD-ROM drive (CDD) 112, and a magneto-optical disk drive (MOD) 113 are connected to the server 1.

Therefore, in the resource information database 12 of such server 1, the resource information as shown in the schematic diagram in FIG. 8 is registered. More specifically, same as the resource information database 12 in the first embodiment schematically shown in FIG. 2, the resource information of three printers 5*a*, 5*b*, 5*c* is registered, and also the resource information relating to the peripheral devices such as FDD 111, CDD 112, MOD 113 connected to the server 1 is registered.

That is, the types of these peripheral devices (FD, CD-ROM, MO), names on the network (all "server 1"), their features (3.5 inch, 10× speed, 640 MB), places of installation (all "south of office"), usable conditions, that is, OS or hardware conditions (all "Windows 95/3.1"), and access conditions (all "none") are registered.

Figure 9:
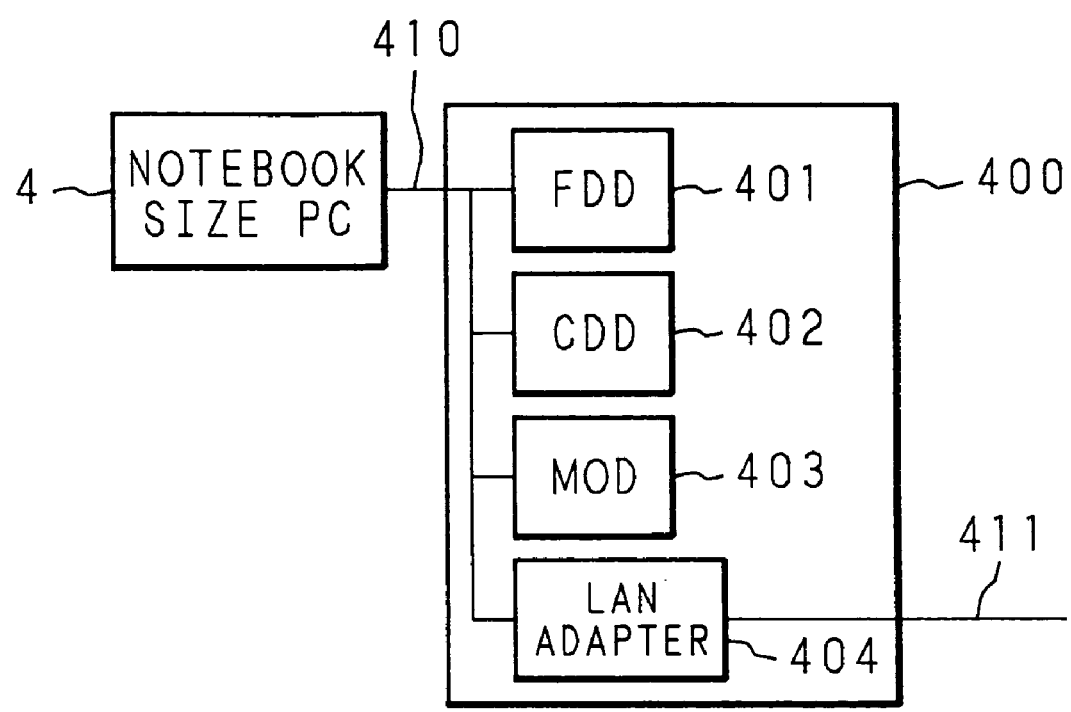
FIG. 9 is a block diagram showing an example of constitution of a client computer.

On the other hand, FIG. 9 is a schematic diagram showing an example of constitution in the case of the user using the notebook size PC 4 on his own desk. When the user uses the notebook size PC 4 on his own desk, generally, it is connected to a docking station 400 by a bus 410. The docking station 400 comprises FDD 401, CDD 402, MOD 403, and LAN adapter 404. The LAN adapter 404 is connected to a LAN circuit 411 different from the LAN circuit 2.

Therefore, in the ordinary state of the user using the notebook size PC 4 on his own desk, the notebook size PC 4 is used as being connected to the docking station 400 which is connected to the LAN circuit 411. In this state, the notebook size PC 4 is accessible to the FDD 401, CDD 402, MOD 403, and is also accessible to the LAN circuit 411 through the LAN adapter 404. However, when the user uses the notebook size PC 4 in other place than his own desk, the notebook size PC 4 is separated from the docking station 400 and moved. In this case, therefore, the FDD 401, CDD 402, MOD 403, etc. cannot be used.

FIG. 10 is a schematic diagram showing the content of the resource information set in the client OS 40 of the notebook size PC 4. The FDD 401 of the docking station 400 is connected to drive A, the internal hard disk to drive C, the CDD 402 of the docking station 400 to drive D, the MOD 403 of the docking station 400 to drive E, and the network drive 1 to drive F, respectively, and the others than the internal hard disk connected to drive C can be replaced. Replacing means that equivalent resource devices, if present, can be used. Moreover, a printer that cannot be replaced is connected to a port LPT No. 1, a replaceable 600 dpi printer (monochromatic) to a printer port No. 1, and a replaceable color printer to a printer port No. 2.

Therefore, when the notebook size PC 4 is separated from the docking station 400 and moved to other place, it means that equivalent devices existing at the destination can be used instead of the FDD 401, CDD 402, MOD 403, etc. For example, when the notebook size PC 4 is separated from the docking station 400, the FDD 401 cannot be used, but if there is a sharable FDD, it can be used through the network (LAN circuit 2). Accordingly, when the resource information list from the service processing unit 11 of the server 1 is received in the notebook size PC 4, if a device equivalent to the resource registered as being replaceable in the client OS 40 of the notebook size PC 4 is present in the resource information list, the resource setting unit 41 replaces with it and sets.

By such processing by the resource setting unit 41, when the notebook size PC 4 is moved from the user's desk to other place and is connected to the LAN circuit 2, by the same setting as in usual resource setting, the FDD 111, CDD 112, MOD 113 connected to the server 1, and the printers 5*a*, 5*b*, 5*c*, etc. connected to the LAN circuit 2 can be used.

When the user selects the software as the resource, same as in the case of the first embodiment, the resource setting unit 41 of the notebook size PC 4 sends a download request of the software, and in the server 1, the service processing unit 11 transmits the program of the software to the notebook size PC 4. In the notebook size PC 4, the resource setting unit 41 receives the transmitted program, and downloads, and registers it in the program menu. As a result, the user can use the software on the notebook size PC 4.

Figure 11:
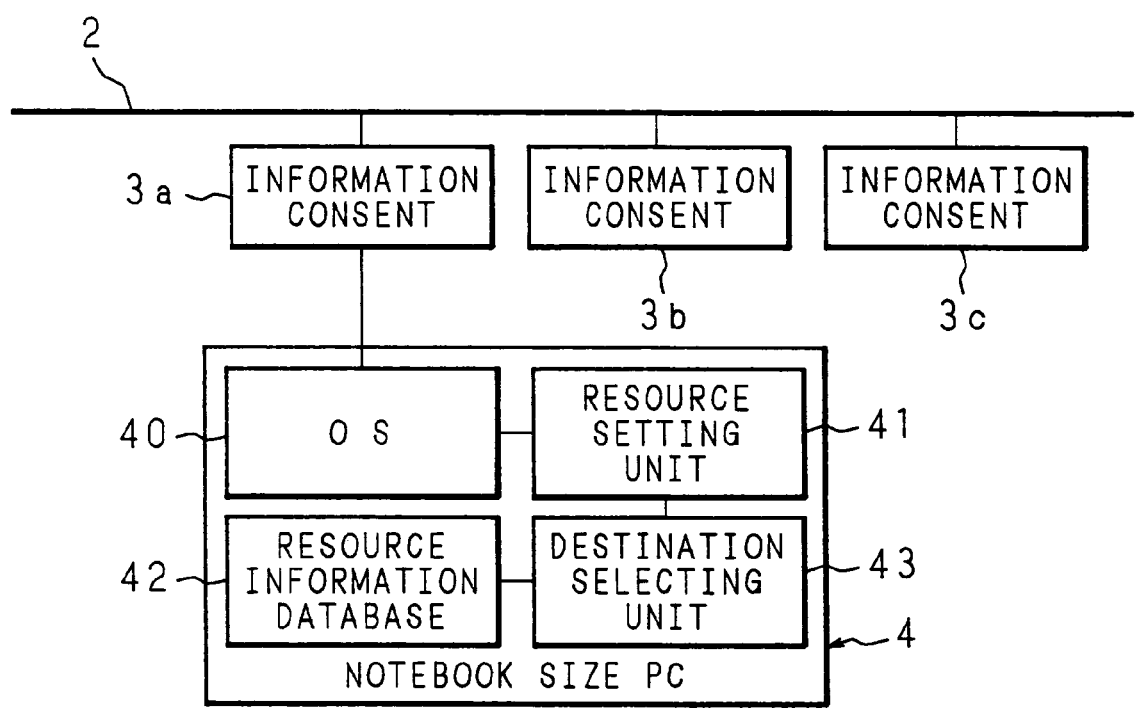
FIG. 11 is a block diagram for explaining a fourth embodiment of the invention.

A fourth embodiment of the invention is described while referring to a block diagram in FIG. 11.

In FIG. 11, reference numeral 2 denotes a LAN circuit, and plural information consents 3a, 3b, 3c are connected thereto. The notebook size PC 4 can freely connect to or disconnect from the information consents 3a, 3b, 3c.

The notebook size PC 4 includes a resource setting unit 41, a resource information database 42, and a destination selecting unit 43. The resource setting unit 41 of the notebook size PC 4 executes processing for actually setting the resource in the notebook size PC 4. In the resource information database 42, a list of resource information corresponding to several preset destinations is registered. The destination selecting unit 43 selects the actually moved place of the user, or the notebook size PC 4, out of the destinations registered in the resource information database 42.

When the user uses the notebook size PC 4 by connecting to the LAN circuit 2, the operation is as follows. First, the user connects the notebook size PC 4 to one of the information consents 3a, 3b, 3c, for example, 3a, then the destination selecting unit 43 displays several destinations registered in the resource information database 42. When the user selects the actual place of move from the displayed destination candidates, the resource setting unit 41 of the notebook size PC 4 reads out and displays a list of resource information registered corresponding to the place from the resource information database 42.

When the list of resource information is displayed in this way, the user sets the resource by referring to the displayed list.

Figure 12:
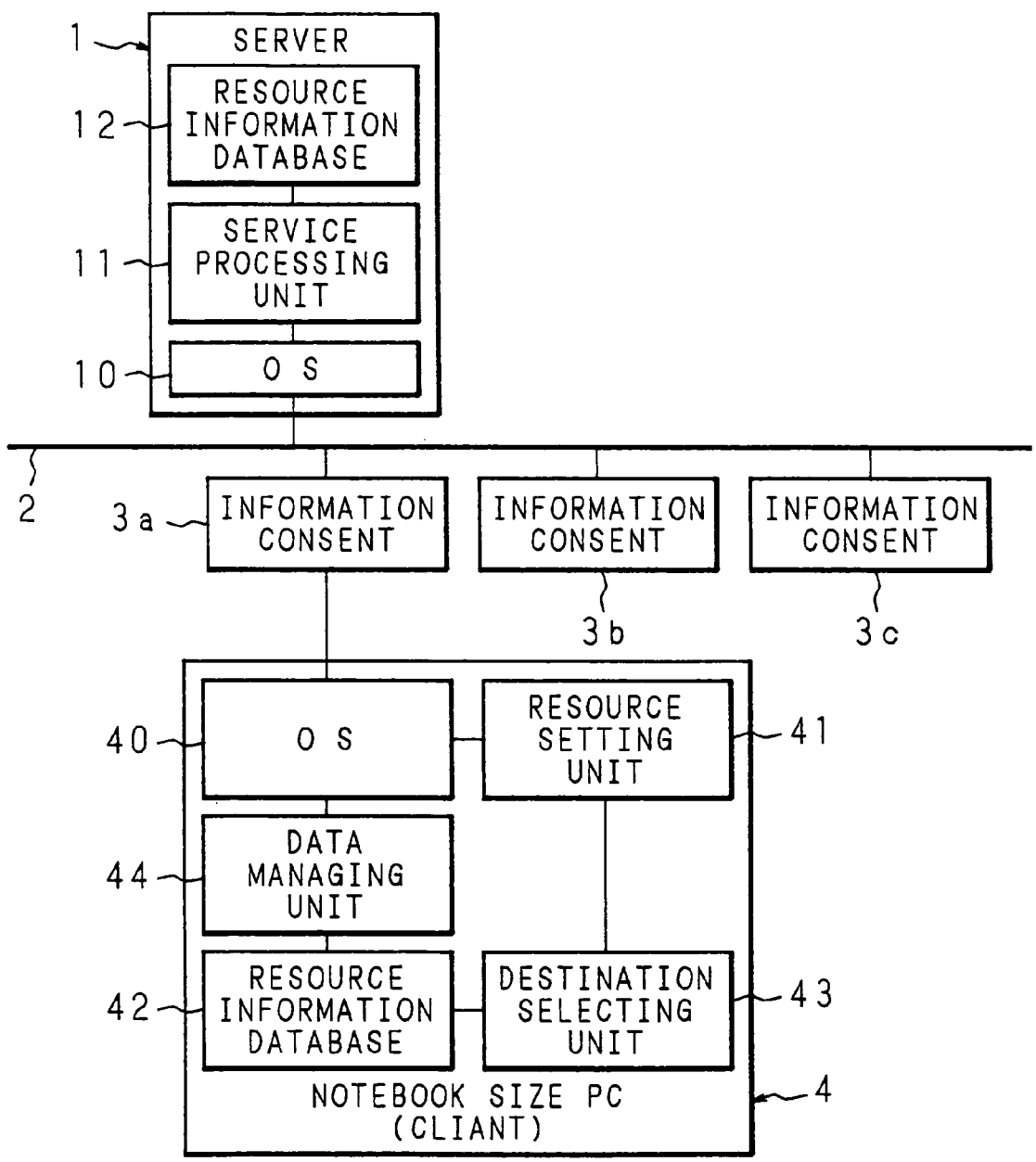
FIG. 12 is a block diagram for explaining a fifth embodiment of the invention.

A fifth embodiment of the invention is described while referring to a block diagram in FIG. 12.

In FIG. 12, reference numeral 2 denotes a LAN circuit, and plural information consents 3a, 3b, 3c, and a server 1 are connected thereto. The notebook size PC 4 as the client computer, can freely connect to or disconnect from the information consents 3a, 3b, 3c.

The server 1 includes a service processing unit 11 and a resource information database 12. The service processing unit 11 processes various services to the notebook size PC 4 which is the client computer. The resource information database 12 stores various data relating to shared resources.

The notebook size PC 4 includes a resource setting unit 41, a resource information database 42, a destination selecting unit 43, and a data managing unit 44. The resource setting unit 41 executes processing for actually setting the resource in the notebook size PC 4. In the resource information database 42, a list of resource information corresponding to several preset destinations is registered. The destination selecting unit 43 selects the actually moved place of the user, or, in other words, the notebook size PC 4, out of the destinations registered in the resource information database 42. The data managing unit 44 receives the updated date of the content of the resource information database 12 transmitted from the service processing unit 11 of the server 1, and when it is later than the updated date of the resource information database 42 of the notebook size PC 4, the content of the resource information data base 12 of the server 1 is downloaded into the resource information database 42.

When the user uses the notebook size PC 4 by connecting to the LAN circuit 2, the operation is as follows. First, the user connects the notebook size PC 4 to one of the information consents 3a, 3b, 3c, for example, 3a, then the resource setting unit 41 of the notebook size PC 4 broadcasts the resource request message to the LAN circuit 2, and waits for response. When the service processing unit 11 of the server 1 receives the message broadcasted from the notebook size PC 4, the resource information database 12 is searched, and a list of resources usable by the notebook size PC 4 is generated, and this list is transmitted to the LAN circuit 2, being a destination to the notebook size PC 4 to which the message has been transmitted from the service processing unit 11.

When the list is thus transmitted from the server 1 to the LAN circuit 2, it is received by the data managing unit 44 of the notebook size PC 4, and the updated date is compared with the updated data of the resource information database 42 of the notebook size PC 4. As a result of comparison by the data managing unit 44, only when the updated date of the resource information database 12 of the server 1 is later, the content is received in the resource setting unit 41, and downloaded into the resource information database 42.

Then, the destination selecting unit 43 displays several destinations registered preliminarily in the resource information database 42. When the user selects the actual place of move out of the displayed destination candidates, the resource setting unit 41 of the notebook size PC 4 reads out and displays a list of resource information registered corresponding to the place from the resource information database 42.

When the list of resource information is displayed in this way, the user sets the resource by referring to the displayed list.

Incidentally, when the notebook size PC 4 is connected to the same information consent 3a (or 3b, 3c) continuously more than a predetermined time, the updated date of the resource information database 12 of the server 1 and the updated date of the resource information database 42 of the notebook size PC 4 may be automatically compared in a predetermined period by the data managing unit 44.

When the user selects the software as the resource, same as in the case of the first embodiment, the resource setting unit 41 of the notebook size PC 4 sends a download request of the software, and in the server 1, the service processing unit 11 transmits the program of the software to the notebook size PC 4. In the notebook size PC 4, the resource setting unit 41 receives the transmitted program, and downloads, and registers it in the program menu. As a result, the user can use the software on the notebook size PC 4.

Figure 13:
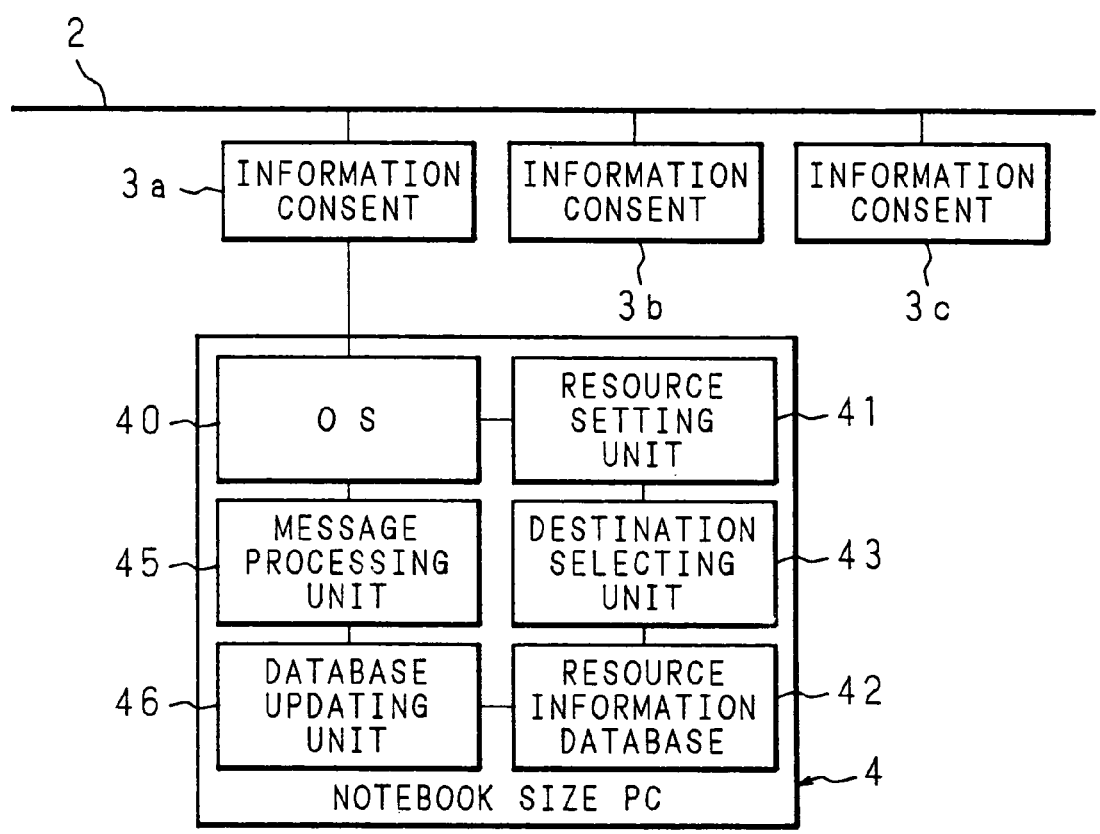
FIG. 13 is a block diagram for explaining a sixth embodiment of the invention.

A sixth embodiment of the invention is described while referring to a block diagram in FIG. 13.

In FIG. 13, reference numeral 2 denotes a LAN circuit, and plural information consents 3a, 3b, 3c are connected thereto. The notebook size PC 4 can freely connect to or disconnect from the information consents 3a, 3b, 3c.

The notebook size PC 4 includes a resource setting unit 41, a resource information database 42, a destination selecting unit 43, a message processing unit 45, and a database updating unit 46. The resource setting unit 41 executes processing for actually setting the resource in the notebook size PC 4. In the resource information database 42, a list of resource information corresponding to several preset destinations is registered. The destination selecting unit 43 selects the actually moved place of the user, or, in other words, the notebook size PC 4, out of the destinations registered in the resource information database 42. The message processing unit 45 receives an updated message of the resource information database 42. The database updating unit 46 updates the resource information database 42 automatically from the received message.

When the user uses the notebook size PC 4 by connecting to the LAN circuit 2, the operation is as follows. First, the user connects the notebook size PC 4 to one of the information consents 3a, 3b, 3c, for example, 3a, then the destination selecting unit 43 displays several destinations registered preliminarily in the resource information database 42. When the user selects the actual place of move out of the displayed destination candidates, the resource setting unit 41 of the notebook size PC 4 reads out and displays a list of resource information registered corresponding to the place from the resource information database 42.

When the list of resource information is displayed in this way, the user sets the resource by referring to the displayed list.

Incidentally, when the user of such network changes the resource information, from a personal computer of the user connected to the LAN circuit 2, for example, by a storage type message such as e-mail, the changed resource information is transmitted to a personal computer having the same function as the notebook size PC 4 through the LAN circuit 2. This message is received in the message processing unit 45 of the notebook size PC 4, and according to its content the database updating unit 46 updates the content of the resource information database 42. Therefore, in this sixth embodiment, not only the administrator of the network, but also the general user can update the resource.

Figure 14:
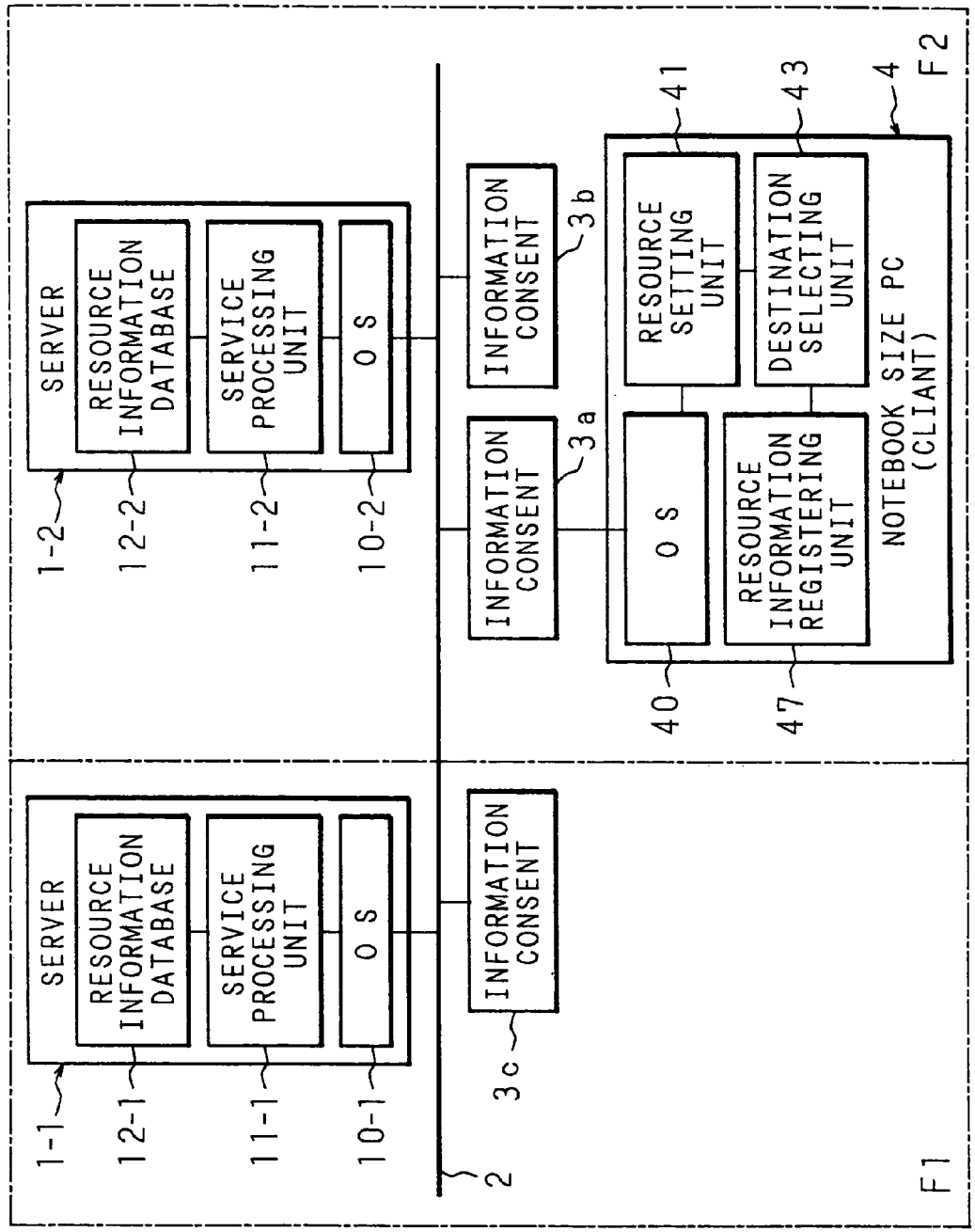
FIG. 14 is a block diagram for explaining a seventh embodiment of the invention.

A seventh embodiment of the invention is described while referring to a block diagram in FIG. 14.

In FIG. 14, reference numeral 2 denotes a LAN circuit, and plural information consents 3a, 3b, 3c, and servers 1-1 and 1-2 are connected thereto. The notebook size PC 4 as the client computer can freely connect to or disconnect from the information consents 3a, 3b, 3c.

The server 1-1 (or 1-2) includes a service processing unit 11-1 (or 11-2) and a resource information database 12-1 (or 12-2). The service processing unit 11-1 (or 11-2) processes various services to the notebook size PC 4 which is the client computer. The resource information database 12-1 (or 12-2) stores various data relating to shared resources.

In the seventh embodiment, two servers 1-1 and 1-2 as mentioned above are connected to the LAN circuit 2, but actually the two servers 1-1 and 1-2 are installed in different places, for example, different floors or different rooms in a same building. In the example shown in FIG. 14, the server 1-1 is installed on a first floor F1 of a certain building, and the server 1-2 on a second floor F2 of the same building. The information consent 3c is installed on the first floor F1, and others 3a, 3b on the second floor F2.

In the server 1-1, a list of resource information of various devices installed on the first floor F1 on which this server 1-1 is installed is registered, and in the server 1-2, similarly, a list of resource information of various devices installed on the second floor F2 on which this server 1-2 is installed is registered.

The notebook size PC 4 includes a resource setting unit 41, a destination selecting unit 43, and a resource information registering unit 47. The resource setting unit 41 of the notebook size PC 4 executes processing for inquiring information relating to the resource to the server 1-1 or 1-2. The destination selecting unit 43 selects the actually moved place of the user, or, in other words, the notebook size PC 4. The resource information registering unit 47 connects to the server 1-1 or 1-2 corresponding to the place selected by the destination selecting unit 43, and downloads or sets the resource information registered in the resource information database 12-1 or 12-2 through the service processing unit 11-1 or 11-2.

When the user uses the notebook size PC 4 by connecting to the LAN circuit 2, the operation is as follows. First, the user connects the notebook size PC 4 to one of the information consents 3a, 3b, 3c, then the destination selecting unit 43 selects the destination, and the resource information registering unit 47 transmits the message to either server 1-1 or 1-2, for example, server 1-1 corresponding to the selected place, and the service processing unit 11 downloads and sets the list of resource information registered in the resource information database 12-1 in the OS 11-1 (operating system).

Therefore, as shown in FIG. 14, when the notebook size PC 4 is connected to the information consent 3a installed on the second floor F2, the user has only to select the second floor F2 out of the places displayed by the destination selecting unit 43. As a result, the resource information registering unit 47 transmits the message to the server 1-2 installed on the second floor F2, and downloads the list of information relating to the resources installed on the second floor F2 from the resource information database 12, and registers and sets in the OS.

Or, when the notebook size PC 4 is connected to the information consent 3c installed on the first floor F1, the user has only to select the first floor F1 out of the places displayed by the destination selecting unit 43. As a result, the resource information registering unit 47 transmits the message to the server 1-1 installed on the first floor F1, and downloads the list of information relating to the resources installed on the first floor F1 from the resource information database 12, and registers and sets in the OS.

Incidentally, when the user selects the software as the resource, same as in the case of the first embodiment, the resource setting unit 41 of the notebook size PC 4 sends a download request of the software, and in the server 1-1 or 1-2, the service processing unit 11-1 or 11-2 transmits the program of the software to the notebook size PC 4. In the notebook size PC 4, the resource setting unit 41 receives the transmitted program, and downloads, and registers it in the program menu. As a result, the user can use the software on the notebook size PC 4.

Figure 15:
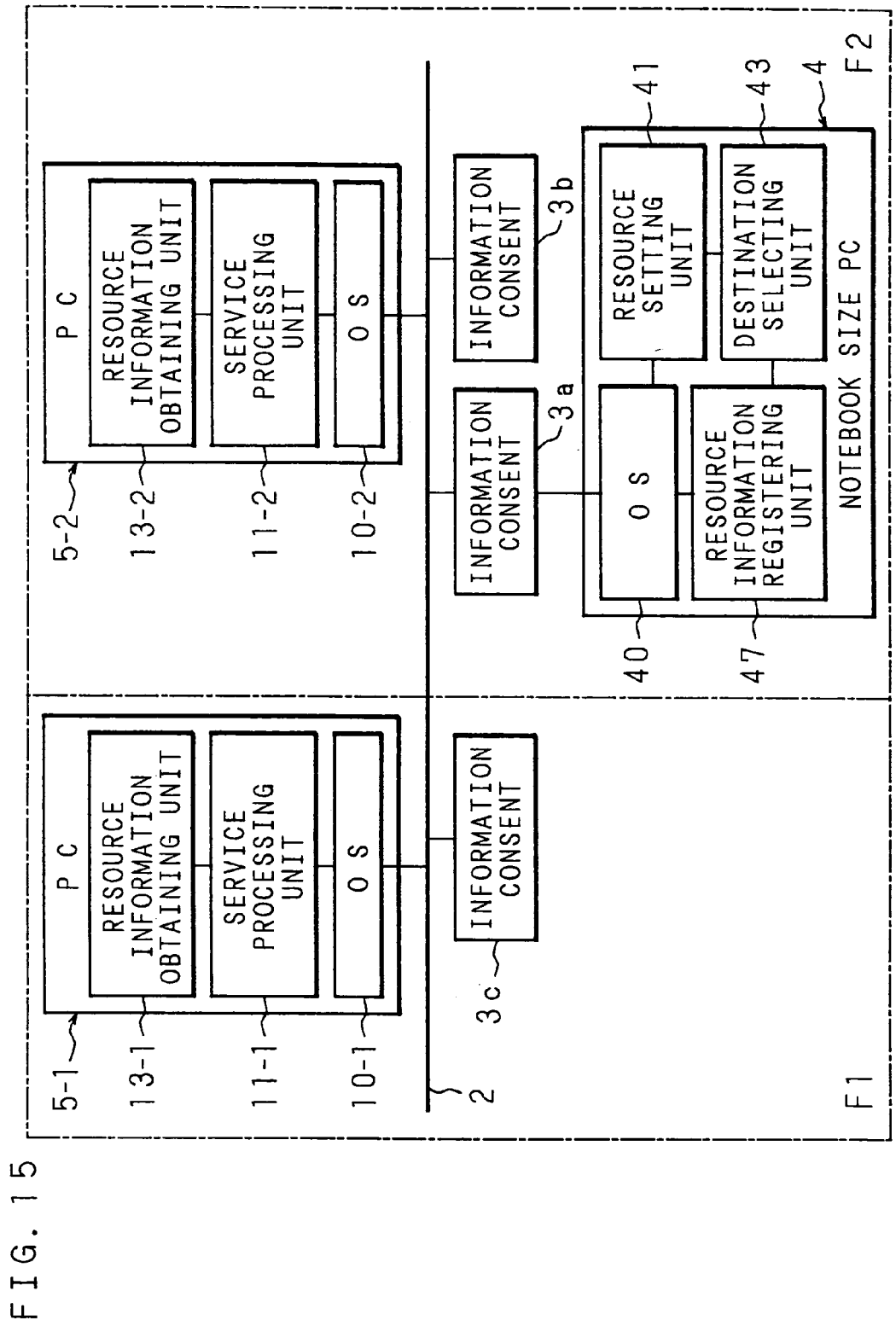
FIG. 15 is a block diagram for explaining an eighth embodiment of the invention.

An eighth embodiment of the invention is described while referring to a block diagram in FIG. 15.

In FIG. 15, reference numeral 2 denotes a LAN circuit, and plural information consents 3a, 3b, 3c, and plural personal computes (PCs) 5-1, 5-2 are connected thereto. The notebook size PC 4 as the client computer can freely connect to or disconnect from the information consents 3a, 3b, 3c.

The PC 5-1 (or 5-2) includes a service processing unit 11-1 (or 11-2) and a resource information obtaining unit 13-1 (or 13-2). The service processing unit 11-1 (or 11-2) processes various services to the notebook size PC 4. The resource information obtaining unit 13-1 (or 13-2) obtains the resource setting information set in the OS (operating system) 10-1 (or 10-2) of the PC 5-1 (or 5-2).

Herein, the two PCs 5-1, 5-2 are installed in different places, for example, different floors or different rooms in a same building. In the example shown in FIG. 15, the PC 5-1 is installed on a first floor F1 of a certain building, and the PC 5-2 on a second floor F2 of the same building. The information consent 3c is installed on the first floor F1, and others 3a, 3b on the second floor F2.

In the PC 5-1, a list of resource information of various devices installed on the first floor F1 on which this PC 5-1 is installed is registered, and in the PC 5-2, similarly, a list of resource information of various devices installed on the second floor F2 on which this PC 5-2 is installed is registered, respectively in the individual OS 10-1, 10-2.

The notebook size PC 4 includes a resource setting unit 41, a destination selecting unit 43, and a resource information registering unit 47. The resource setting unit 41 executes processing for inquiring information relating to the resource to the PC 5-1 or 5-2. The destination selecting unit 43 selects the actually moved place of the user, or the notebook size PC 4. The resource information registering unit 47 connects to the PC 5-1 or 5-2 corresponding to the place selected by the destination selecting unit 43, and downloads or sets the resource information registered in the resource information database 12 through the service processing unit 11-1 or 11-2.

When the user uses the notebook size PC 4 by connecting to the LAN circuit 2, the operation is as follows. First, the user connects the notebook size PC 4 to one of the information consents 3a, 3b, 3c, then the destination selecting unit 43 selects the actual destination, and the resource information registering unit 47 transmits the message to either PC 5-1 or 5-2, for example, PC 5-1 corresponding to the selected place, and downloads the list of resource information registered in the OS 10-1 from its service processing unit 11-1 and sets in its own OS 40.

Therefore, as shown in FIG. 15, when the notebook size PC 4 is connected to the information consent 3a installed on the second floor F2, the destination selecting unit 43 selects the second floor F2, and the resource information registering unit 47 transmits the message to the PC 5-2 installed on the second floor F2, and downloads the list of information relating to the resources installed on the second floor F2 from the OS 10-2 of the PC 5-2, and sets in the own OS 40.

Or, when the notebook size PC 4 is connected to the information consent 3c installed on the first floor F1, the destination selecting unit 43 selects the first floor F1, and the resource information registering unit 47 transmits the message to the PC 5-1 installed on the first floor F1, and downloads the list of information relating to the resources installed on the first floor F1 from the OS 10-1 of the PC 5-1, and sets in the own OS 40.

Incidentally, when the user selects the software as the resource, same as in the case of the first embodiment, the resource setting unit 41 of the notebook size PC 4 sends a download request of the software, and in the PC 5-1 or 5-2, the service processing unit 11 transmits the program of the software to the notebook size PC 4. In the notebook size PC 4, the resource setting unit 41 receives the transmitted program, and downloads, and registers it in the program menu. As a result, the user can use the software on the notebook size PC 4.

Figure 16:
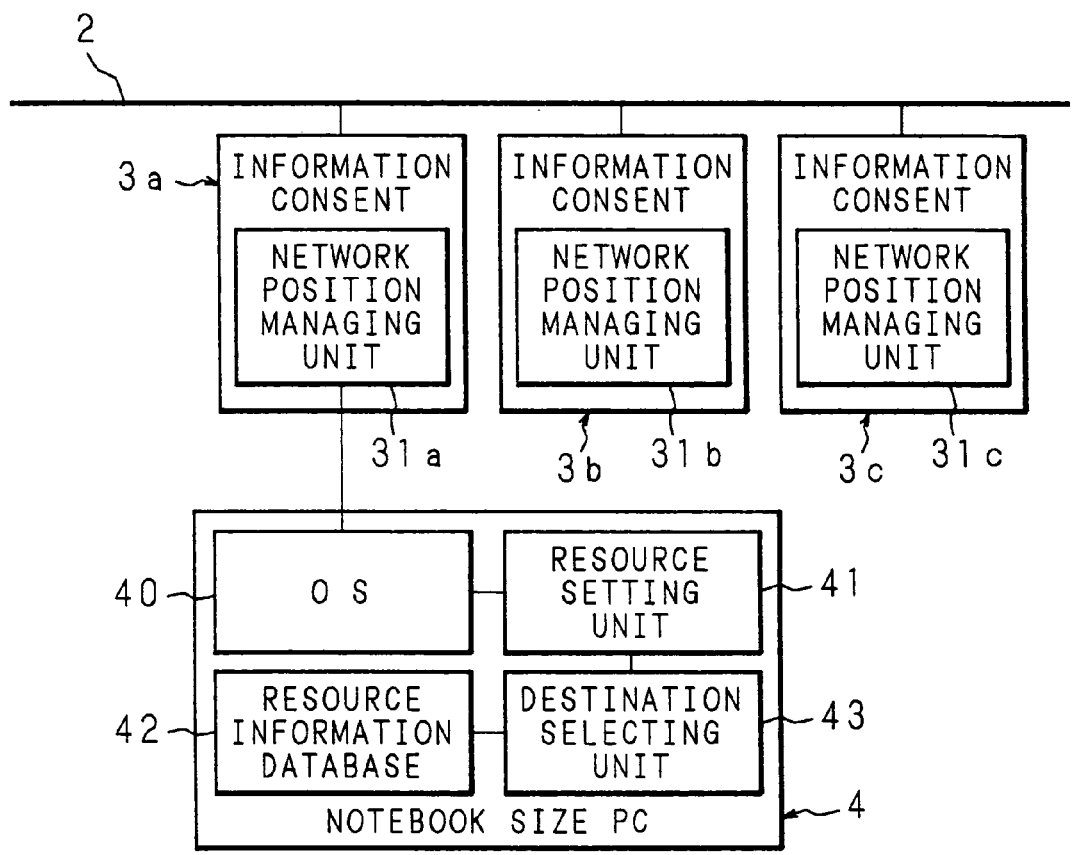
FIG. 16 is a block diagram for explaining a ninth embodiment of the invention.

A ninth embodiment of the invention is described while referring to a block diagram in FIG. 16.

In FIG. 16, reference numeral 2 denotes a LAN circuit, and plural information consents 3a, 3b, 3c are connected thereto. The notebook size PC 4 can freely connect to or disconnect from the information consents 3a, 3b, 3c.

The information consents 3a, 3b, 3c are provided with network position managing units 31a, 31b, 31c, respectively. In each one of these network position managing units 31a, 31b, 31c, a unique identifier is stored, and when the notebook size PC 4 is connected to one of the information consents 3a, 3b, 3c, the identifier stored in the corresponding network position managing unit 31a, 31b, or 31c is read into the notebook size PC 4.

The notebook size PC 4 includes a resource setting unit 41, a resource information database 42, and a destination selecting unit 43. The resource setting unit 41 executes processing for actually setting the resource to the notebook size PC 4. In the resource information database 42, a list of resource information corresponding to several preset destinations is registered. The destination selecting unit 43 reads out the identifier from the network position managing unit 31a, 31b, or 31c when the notebook size PC 4 is connected to one of the information consents 3a, 3b, 3c, and selects the corresponding destination out of the destinations registered in the resource information database 42.

When the user uses the notebook size PC 4 by connecting to the LAN circuit 2, the operation is as follows. First, the user connects the notebook size PC 4 to one of the information consents 3a, 3b, 3c, for example, 3a, then the destination selecting unit 43 reads out the identifier from the network position managing unit 31a of the information consent 3a, and selects the corresponding destination out of several destinations preliminarily registered in the resource information database 42. Consequently, the resource setting unit 41 of the notebook size PC 4 reads out a list of resource information registered corresponding to the destination out of the resource information database 42, and registers in the OS.

Therefore, in the ninth embodiment, once the user connects the notebook size PC 4 to one of the information consents 3a, 3b, 3c, the list of the resource information is automatically registered in the OS, so that the user has nothing to do thereafter.

Figure 17:
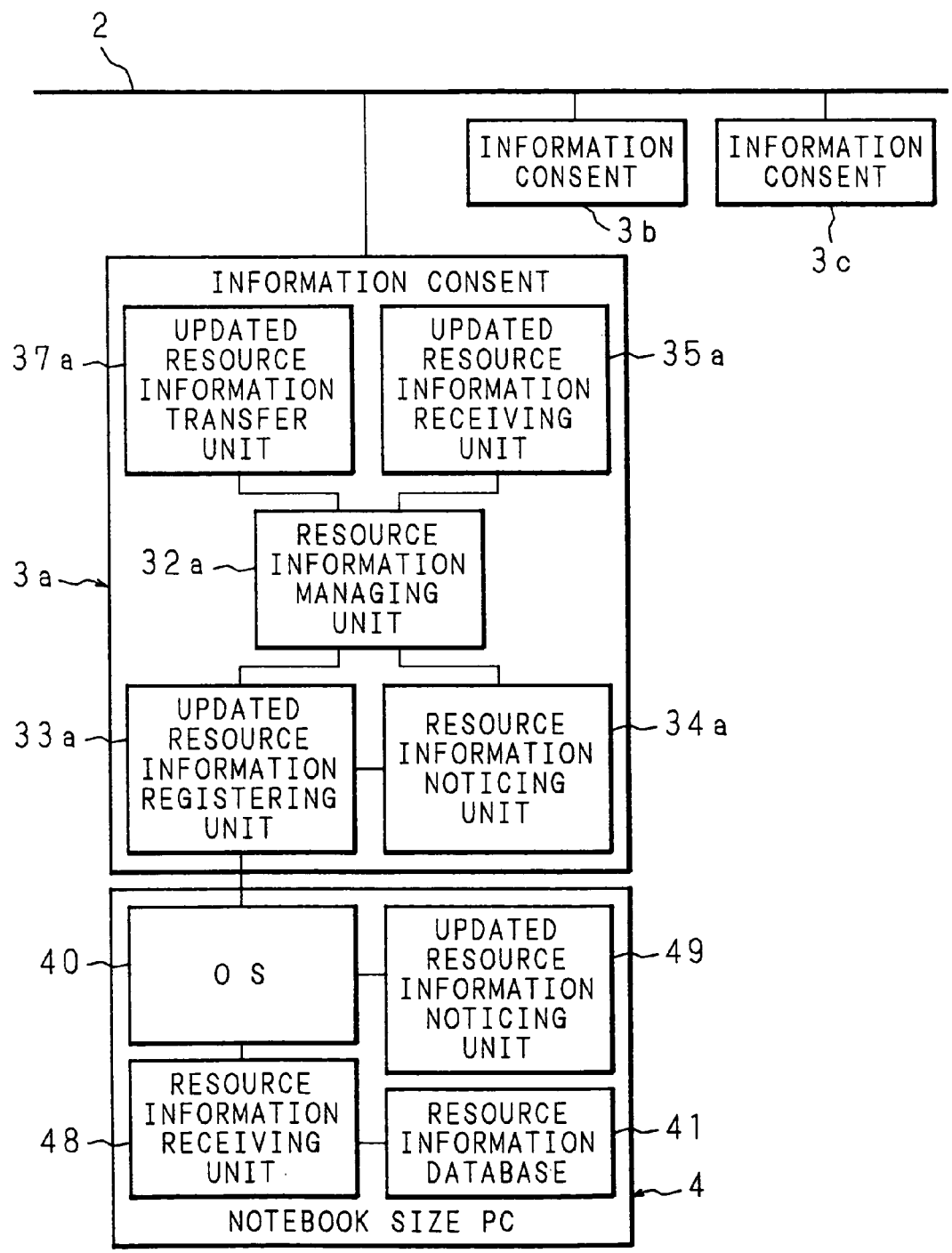
FIG. 17 is a block diagram for explaining a tenth embodiment of the invention.

A tenth embodiment of the invention is described while referring to a block diagram in FIG. 17.

In FIG. 17, reference numeral 2 denotes a LAN circuit, and plural information consents 3a, 3b, 3c are connected thereto. The notebook size PC 4 can freely connect to or disconnect from the information consents 3a, 3b, 3c.

The information consents 3a, 3b, 3c are identical in constitution, and the information consent 3a is described herein. The information consent 3a comprises a resource information managing unit 32a, an updated resource information registering unit 33a, a resource information noticing unit 34a, an updated resource information receiving unit 35a, and an updated resource information transfer unit 37a.

In the resource information managing unit 32a, resource information usable near the information consent 3a in which it is provided is registered. The updated resource information registering unit 33a processes updated registration of the resource information registered in the resource information managing unit 32a. The resource information noticing unit 34a obtains the resource information registered in the resource information managing unit 32a when it is updated by the updated resource information registering unit 33a, and notices it to the notebook size PC 4 connected to the information consent 3a in which it is provided. The updated resource information receiving unit 35a receives the updated resource information flowing in the LAN circuit 2, so that the updated resource information registering unit 33a updates the content of the resource information managing unit 32a. The updated resource information transfer unit 37a sends out the differential information to the LAN circuit 2 when the content of the resource information managing unit 32a is updated.

The notebook size PC 4 includes a resource setting unit 41, a resource information receiving unit 48, and an updated resource information noticing unit 49. The resource setting unit 41 executes processing for actually setting the resource to the notebook size PC 4. The resource information receiving unit 48 receives the resource information from the resource information noticing unit 34a when the notebook size PC 4 is connected to the information consent 3a (or 3b, 3c).

The updated resource information noticing unit 49 notices new resource information through the updated resource information registering unit 33a for updating the resource information registered in the resource information managing unit 32a, for example, when the notebook size PC 4 is connected to the information consent 3a out of the information consents. This updated resource information noticing unit 49 is provided in at least one of the notebook size PCs 4 connected to the LAN circuit 2.

When the user uses the notebook size PC 4 by connecting to the LAN circuit 2, the operation is as follows. First, the user connects the notebook size PC 4 to one of the information consents 3a, 3b, 3c, for example, 3a, then the resource information noticing unit 34a obtains a list of resource information from the updated resource information registering unit 33a of the information consent 3*a*, and notices to the notebook size PC 4. In the notebook size PC 4, a list of resource information noticed from the resource information noticing unit 34*a* is received by the resource information receiving unit 48, and the resource setting unit 41 registers and sets in the OS.

Therefore, in the tenth embodiment, once the user connects the notebook size PC 4 to any one of the information consents 3*a*, 3*b*, 3*c*, for example, 3*a*, the resource information near the information consent 3*a* is automatically obtained in the notebook size PC 4 from the resource information managing unit 32*a*, and registered in its OS, so that the user has nothing to do thereafter.

Incidentally, the resource information registered in the resource information managing unit 32*a* of the information consents 3*a*, 3*b*, 3*c* is updated when the notebook size PC 4 having the updated resource information noticing unit 49 is connected to this information consent 3*a*, and new resource information, that is, updated resource information is noticed from the updated resource information noticing unit 49 to each resource information managing unit 32*a* through the updated resource information registering unit 33*a* of the information consent 3*a*. This is same in the other information consents 3*b*, 3*c*. In this case, the difference between the updated resource information and the resource information stored in the resource information managing unit 32*a* so far is sent out to the LAN circuit 2 from, for example, the updated resource information transfer unit 37*a* of the information consent 3*a*. In the other information consents 3*b*, 3*c*, the difference of the resource information sent out to the LAN circuit 2 in this manner is received in each updated resource information receiving unit from the LAN circuit 2, and the content of each resource information managing unit is updated.

Figure 18:
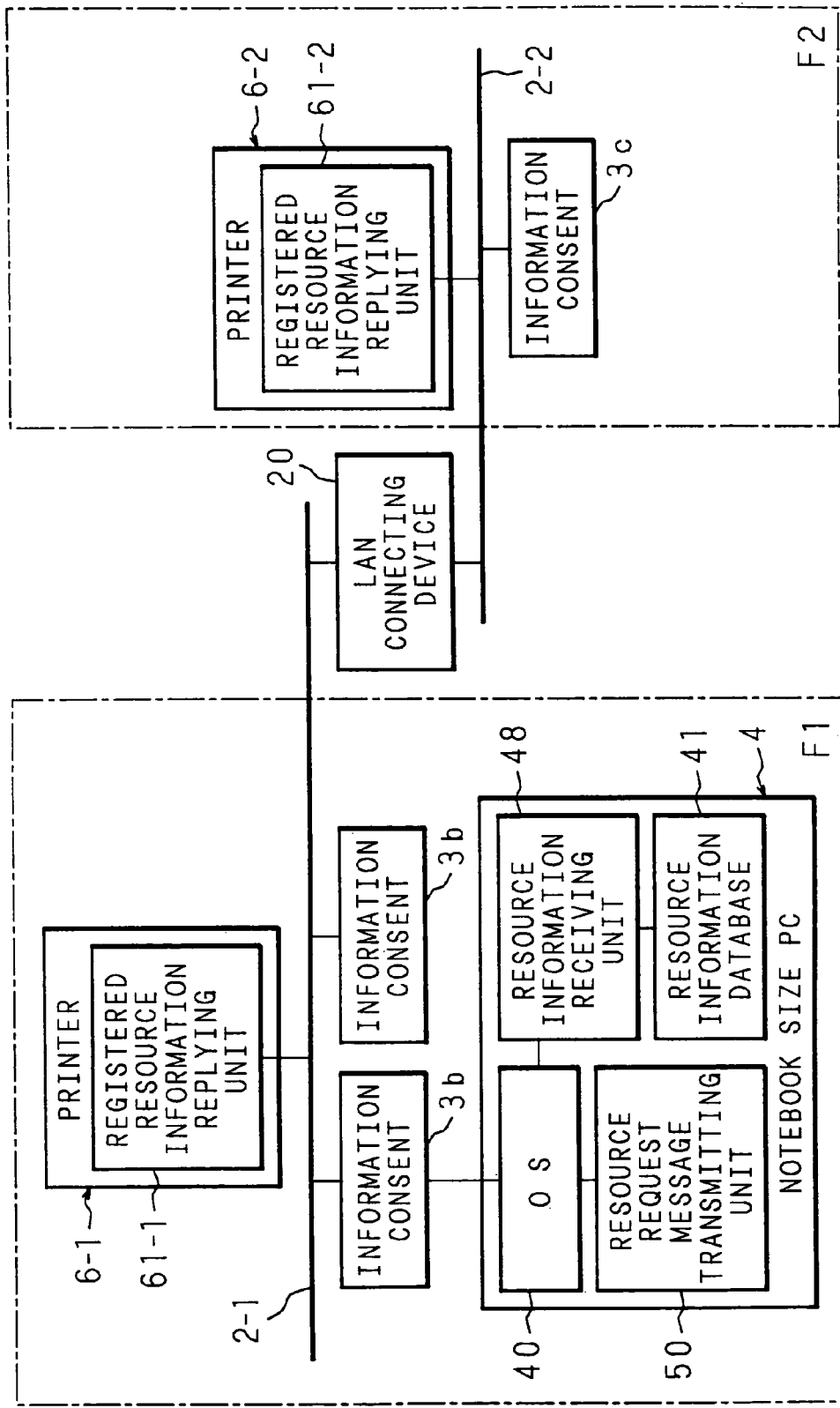
FIG. 18 is a block diagram for explaining an eleventh embodiment of the invention.

An eleventh embodiment of the invention is described while referring to a block diagram in FIG. 18.

In FIG. 18, reference numerals 2-1 and 2-2 denote independent LAN circuits, which are connected by a LAN connecting device 20. When communicating from one LAN circuit 2-1 (or 2-2) to other LAN circuit 2-2 (or 2-1) across the LAN connecting device 20, it is necessary to designate the LAN address. Information consents 3*a*, 3*b* are connected to the LAN circuit 2-1, and information consent 3*c* to the LAN circuit 2-2, and the notebook size PC 4 can freely connect to or disconnect from the information consents 3*a*, 3*b*, 3*c*.

In the eleventh embodiment, thus, the two LAN circuits 2-1, 2-2 are connected through the LAN connecting device 20, but actually the both LAN circuits 2-1, 2-2 are installed in different places, for example, on different floors or in different rooms of a same building. In the example shown in FIG. 18, the LAN circuit 2-1 is installed on a first floor F1 of a certain building, and the LAN circuit 2-2 is on a second floor F2 of the same building. The information consent 3*c* is connected to the LAN circuit 2-1 of the first floor F1, and the others 3*a*, 3*b* to the LAN circuit 2-2 on the second floor F2.

Further, in the LAN circuit 2-1, that is, on the first floor F1, a peripheral device 6-1 such as printer is connected, and in the LAN circuit 2-2, that is, on the second floor F2, a peripheral device 6-2 such as printer is connected.

The notebook size PC 4 includes a resource setting unit 41, a resource information receiving unit 48, and a resource request message transmitting unit 50. The resource setting unit 41 executes processing for actually setting the resource to the notebook size PC 4. The resource information receiving unit 48 receives the reply message of the message transmitted from the resource request message transmitting unit 50 to the LAN circuit 2-1 (or 2-2). The resource request message transmitting unit 50 transmits the message only to the device connected to the same LAN circuit 2-1 (or 2-2) as in the notebook size PC 4 in order to search the resource.

The peripheral devices 6-1, 6-2 are provided with registered resource information replying units 61-1, 61-2, aside from the intrinsic functions. The registered resource information replying units 61-1, 61-2 transmit the resource information for registering themselves in the notebook size PC 4 when receiving the message broadcasted from the resource setting unit 41 of the notebook size PC 4.

When the user uses the notebook size PC 4 by connecting to the LAN circuit 2-1 or 2-2, the operation is as follows. First, the user connects the notebook size PC 4 to one of the information consents 3*a*, 3*b*, 3*c*, for example, the information consent 3*a* connected to the LAN circuit 2-1 on the first floor, then the resource request message is broadcasted from the resource request message transmitting unit 50 of the notebook size PC 4 only to the range within LAN circuit 2-1 to which this notebook size PC 4 is connected, in other words, in a range not exceeding the LAN connecting device 20.

The resource request message broadcasted from the resource request message transmitting unit 50 of the notebook size PC 4 to the LAN circuit 2-1 through the information consent 3*a* is received in the device having the registered resource information replying units (61-1, 61-2) in the device connected to the LAN circuit 2-1, that is, the peripheral device 6-1 in the example shown in FIG. 18. The registered resource information replying unit 61-1 of the peripheral device 6-1, when receiving the resource request message broadcasted from the notebook size PC 4, transmits the resource information for registering itself in the notebook size PC 4.

Thus, the resource information replied from the registered resource information replying unit 61-1 of the peripheral device 6-1 is received in the resource information receiving unit 48 of the notebook size PC 4, and the resource setting unit 41 registers and sets in the OS.

Therefore, in the eleventh embodiment, once the user connects the notebook size PC 4 to any one of the information consents 3*a*, 3*b*, 3*c*, the resource information in the device connected to the LAN circuit 2-1 (or 2-2) to which the information consent 3*a* is connected, in other words, only in the place where the LAN circuit 2-1 (or 2-2) is installed is automatically obtained in the notebook size PC 4 and registered in its OS, so that the user has nothing to do thereafter.

Figure 19:
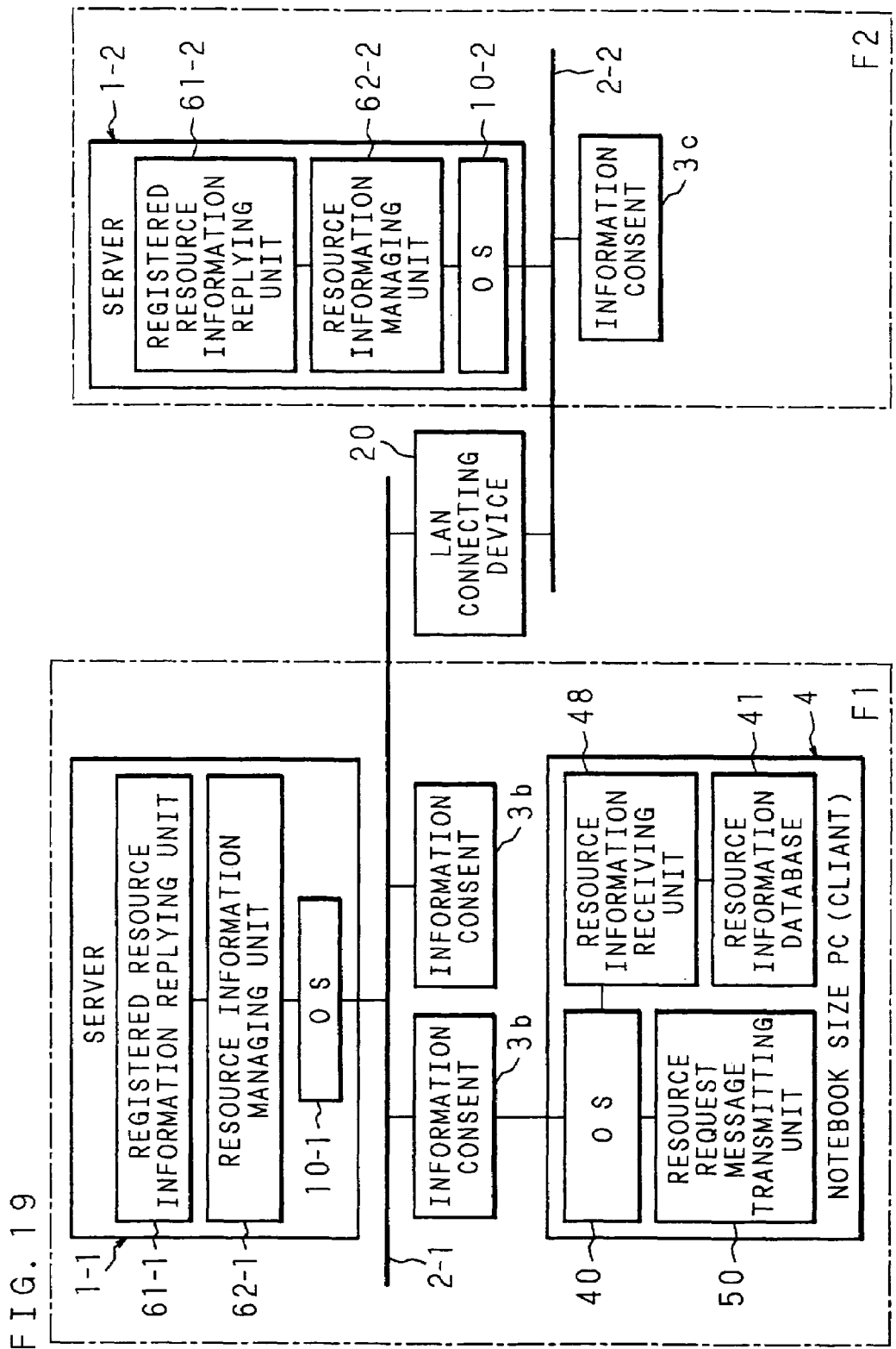
FIG. 19 is a block diagram for explaining a twelfth embodiment of the invention.

A twelfth embodiment of the invention is described while referring to a block diagram in FIG. 19.

In FIG. 19, reference numerals 2-1 and 2-2 denote independent LAN circuits, which are connected by a LAN connecting device 20. When communicating from one LAN circuit 2-1 (or 2-2) to other LAN circuit 2-2 (or 2-1) across the LAN connecting device 20, it is necessary to designate the LAN address. Information consents 3*a*, 3*b* are connected to the LAN circuit 2-1, and information consent 3*c* to the LAN circuit 2-2, and the notebook size PC 4 can freely connect to or disconnect from the information consents 3*a*, 3*b*, 3*c*.

In the twelfth embodiment, thus, the two LAN circuits 2-1, 2-2 are connected through the LAN connecting device 20, but actually the both LAN circuits 2-1, 2-2 are installed in different places, for example, on different floors or in different rooms of a same building. In the example shown in FIG. 19, the LAN circuit 2-1 is installed on a first floor F1 of a certain building, and the LAN circuit 2-2 is on a second floor F2 of the same building. The information consent 3*c* is connected to the LAN circuit 2-1 of the first floor F1, and the others 3*a*, 3*b* to the LAN circuit 2-2 on the second floor F2.

Further, a server 1-1 is connected to the LAN circuit 2-1, and a server 1-2 to the LAN circuit 2-2. In other words, the server 1-2 is installed on the first floor F1, and the LAN circuit 2-1 on the second floor F2.

The notebook size PC 4 includes a resource setting unit 41, a resource information receiving unit 48, and a resource request message transmitting unit 50. The resource setting unit 41 executes processing for actually setting the resource to the notebook size PC 4. The resource information receiving unit 48 receives the reply message of the message transmitted from the resource request message transmitting unit 50 to the LAN circuit 2-1 (or 2-2). The resource request message transmitting unit 50 transmits the message only to the device connected to the same LAN circuit 2-1 (or 2-2) as in the notebook size PC 4 in order to search the resource.

The servers 1-1, 1-2 are provided with registered resource information replying units 61-1, 61-2, and resource information managing units 62-1, 62-2. The registered resource information replying units 61-1, 61-2 transmit the resource information for registering the resource information in the notebook size PC 4 when receiving the message broadcasted from the resource setting unit 41 of the notebook size PC 4. The resource information managing units 62-1, 62-2 are managing the resource information usable in the periphery of the installation of their servers 1-1, 1-2, that is, the place of installation of the LAN circuit 2-1 or 2-2 to which the server 1-1 or 1-2 is connected.

When the user uses the notebook size PC 4 by connecting to the LAN circuit 2-1 or 2-2, the operation is as follows. First, the user connects the notebook size PC 4 to one of the information consents 3a, 3b, 3c, for example, the information consent 3a connected to the LAN circuit 2-1 on the first floor, then the resource request message is broadcasted from the resource request message transmitting unit 50 of the notebook size PC 4 only to the range within LAN circuit 2-1 to which this notebook size PC 4 is connected, in other words, in a range not exceeding the LAN connecting device 20.

The resource request message broadcasted from the resource request message transmitting unit 50 of the notebook size PC 4 to the LAN circuit 2-1 through the information consent 3a is received in the registered resource information replying unit 61-1 of the server 1-1 connected to the LAN circuit 2-1. The registered resource information replying unit 61-1 of the server 1-1, when receiving the resource request message broadcasted from the notebook size PC 4, replies a list of resource information managed by itself.

Thus, the list of resource information replied from the registered resource information replying unit 61-1 of the server 1-1 is received in the resource information receiving unit 48 of the notebook size PC 4, and the resource setting unit 41 registers and sets in the OS.

Therefore, in the twelfth embodiment, once the user connects the notebook size PC 4 to any one of the information consents 3a, 3b, 3c, the resource information managed by the server 1-1 (or 1-2) connected to the LAN circuit 2-1 (or 2-2) to which the information consent 3a is connected, in other words, the resource information only in the place where the LAN circuit 2-1 (or 2-2) is installed is automatically obtained in the notebook size PC 4 and registered in its OS, so that the user has nothing to do thereafter.

In the preceding eleventh embodiment, the resource information of only the device having the registered resource information replying units (61-1, 61-2) is obtained, and if the device not having the registered resource information replying units (61-1, 61-2) is connected to the LAN circuit 2-1 (or 2-2), the resource information of that device was not obtained. By contrast, in the twelfth embodiment, by registering the resource information of all necessary devices in the resource information managing units 62-1, 62-2 of the servers 1-1, 1-2, the resource information of all devices in the periphery of the LAN circuit 2-1 (or 2-2) to which the notebook size PC 4 is connected can be obtained.

Instead of the servers 1-1, 1-2, other PC may be connected to other information consent 3b of the LAN circuit 2-1 (2-2) to which the notebook size PC 4 is connected, and the resource information of that PC can be obtained in the notebook size PC 4.

Incidentally, when the user selects the software as the resource, same as in the case of the first embodiment, the resource setting unit 41 of the notebook size PC 4 sends a download request of the software, and in the server 1-1 or 1-2, the registered resource information replying unit 61-1 or 61-2 transmits the program of the software to the notebook size PC 4. In the notebook size PC 4, the resource setting unit 41 receives the transmitted program, and downloads, and registers it in the program menu. As a result, the user can use the software on the notebook size PC 4.

Figure 20:
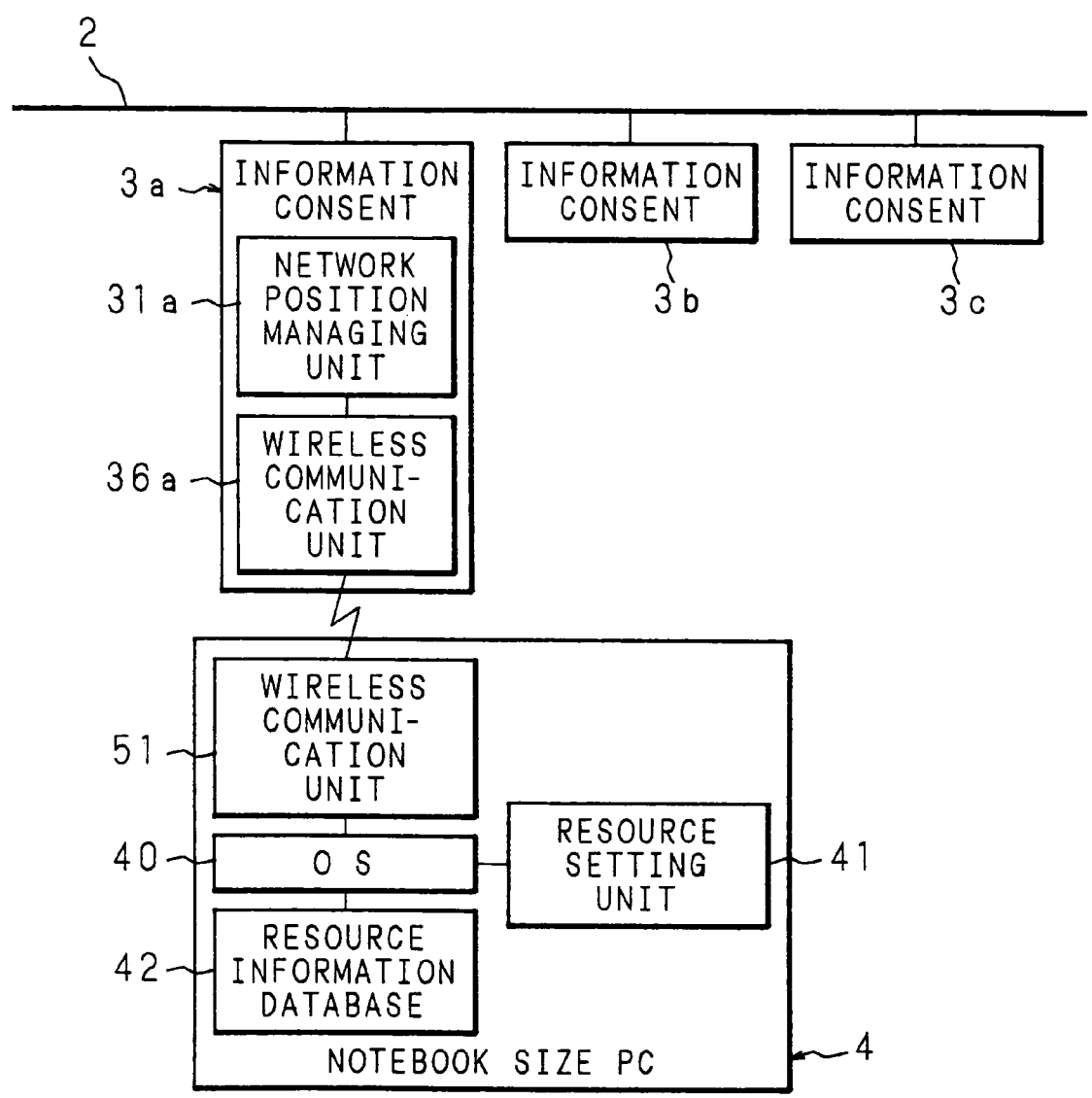
FIG. 20 is a block diagram for explaining a thirteenth embodiment of the invention.

A thirteenth embodiment of the invention is described while referring to a block diagram in FIG. 20.

In FIG. 20, reference numeral 2 denotes a LAN circuit, and plural information consents 3a, 3b, 3c are connected thereto. The notebook size PC 4 can freely connect to or disconnect from the information consents 3a, 3b, 3c.

The information consents 3a, 3b, 3c are identical in constitution, and the information consent 3a is explained below. The information consent 3a includes a network position managing unit 31a and a wireless communication unit 36a. A unique identifier is stored in the network position managing unit 31a, and when the notebook size PC 4 is connected to the information consent 3a having it, the identifier stored in the network position managing unit 31a is read into the notebook size PC 4. The wireless communication unit 36a is used for wireless communication with the notebook size PC 4.

The notebook size PC 4 includes a resource setting unit 41, a resource information database 42, and a wireless communication unit 51. The resource setting unit 41 executes processing for actually setting the resource in the notebook size PC 4. In the resource information database 42, a list of resource information corresponding to several preset destinations is registered. The wireless communication unit 51 is used for wireless communication with the wireless communication unit 36a of the information consents 3a, 3b, 3c. Of course, in other information consent 3c, a wireless communication unit is provided same as in the information consent 3a, and the wireless communication unit 51 can also communicate wireless with the others.

Between the wireless communication unit of the information consents 3a, 3b, 3c and the wireless communication unit 51 of the notebook size PC 4, wireless (infrared ray) communication is done according to a standard such as the IrDA.

When the user uses the notebook size PC 4 by connecting to the LAN circuit 2, the operation is as follows. In this thirteenth embodiment, however, the notebook size PC 4 and the LAN circuit 2 are not connected physically, but are connected by wireless communication as stated above.

First, the user puts the notebook size PC 4 near one of the information consents 3a, 3b, 3c, for example, 3a, then the wireless communication unit 51 of the notebook size PC 4 reads out the identifier from the network position managing unit 31a of the information consent 3a by wireless communication, and selects the corresponding destination out of the several destinations registered preliminarily in the resource information database 42. Then the resource setting unit 41 of the notebook size PC 4 reads out a list of resource information registered corresponding to the place from the resource information database 42, and registers in the OS. This is the same in the other information consents 3b, 3c.

Therefore, in the thirteenth embodiment, the user has only to put the notebook size PC 4 at distance and position possible for wireless communication, without physically connected to any one of the information consents 3a, 3b, 3c, then a list of resource information is automatically registered in the OS, so that the user has nothing to do thereafter.

A fourteenth embodiment of the invention is described while referring to a block diagram in FIG. 21.

In FIG. 21, reference numeral 2 denotes a LAN circuit, and plural information consents 3a, 3b, 3c are connected thereto. The notebook size PC 4 can freely connect to or disconnect from the information consents 3a, 3b, 3c. To the LAN circuit 2, moreover, a radio base station 8 as described below is connected through a communication circuit 83, for example, a telephone circuit.

The information consents 3a, 3b, 3c are respectively provided with network position managing units 31a, 31b, 31c, and radio communication units 36a, 36b, 36c. A unique identifier is stored in each one of the network position managing units 31a, 31b, 31c, and when the notebook size PC 4 is connected to one of the information consents 3a, 3b, 3c, the identifier stored in the network position managing unit 31a, 31b, or 31c is read into the notebook size PC 4. The wireless communication units 36a, 36b, 36c are used for wireless communication with the notebook size PC 4.

The notebook size PC 4 includes a resource setting unit 41, a resource information database 42, and a destination selecting unit 43. The resource setting unit 41 executes processing for actually setting the resource in the notebook size PC 4. In the resource information database 42, a list of resource information corresponding to several preset destinations is registered. The destination selecting unit 43 selects the destination according to the location information noticed from the radio base station 8 out of plural destination candidates registered in the resource information database 42.

Reference numeral 7 is a portable radio equipment, more specifically a device capable of locating the position in the radio base station 8, for example, a portable terminal of PHS (Personal Handy-phone System), and in this example, it is supposed that the radio base station 8 is installed indoors, and plural portable radio equipments 7 are used as extension telephones.

The radio base station 8 is a base station of such system as mentioned above, and is connected to multiple other radio base stations through a network circuit 80. This radio base station 8 includes a base station position managing unit 81 and a user corresponding unit 82. The base station position managing unit 81 manages the identifier indicating the location of the radio base station 8 itself including this base station position managing unit 81. The user corresponding unit 82 stores the information for corresponding the identification of the user of the portable radio equipment 7 and the user of the notebook size PC 4.

When the user uses the notebook size PC 4 by connecting to the LAN circuit 2, the operation is as follows. First, the user connects the notebook size PC 4 to one of the information consents 3a, 3b, 3c, for example, 3a, and manipulates the portable radio equipment 7 to connect to the radio base station 8. As a result, the radio base station 8 detects that the portable radio equipment 7 is existing within its communication area, and broadcasts the identifier indicating its location to the LAN circuit 2 from the base station position managing unit 81 through the communication circuit 83. At the same time, the radio base station 8 identifies the user corresponding to the detected portable radio equipment 7 from the data stored in the user corresponding unit 82.

The output broadcasted from the base station position managing unit 81 of the radio base station 8 is received by the information consent, for example, the information consent 3a, coinciding with the identifier stored in the network position managing units 31a, 31b, 31c in the information consents 3a, 3b, 3c connected to the LAN circuit 2. As a result, the information consent 3a recognizes that the notebook size PC 4 is present nearby.

Then, the wireless communication unit 51 of the notebook size PC 4 reads out the identifier from the network position managing unit 31a of the information consent 3a by wireless communication, and selects the corresponding destination out of the several destinations registered preliminarily in the resource information database 42. Then the resource setting unit 41 of the notebook size PC 4 reads out a list of resource information registered corresponding to the place from the resource information database 42, and registers in the OS.

Therefore, in the fourteenth embodiment, the position of the portable radio equipment 7 held by the user of the notebook size PC 4 is detected by the radio base station 8, and the position information is noticed to the notebook size PC 4 through the information consent 3a (or 3b, 3c) to which the notebook size PC 4 is connected, and a list of resource information is automatically registered in the OS of the notebook size PC 4, so that the user has nothing to do at all.

In the foregoing embodiments, as described above, the portable notebook size PC is connected to the information consent, but this is only an example, and, not limited to the notebook size PC, it may be applied to a general computer system, whether desk top type or tower type.

According to the invention, as specifically described herein, when the computer is connected to the information consent of the network circuit, the resource information relating to the resource usable in the area through the network circuit is set either semiautomatically or automatically, and the function of the network can be fully utilized, so that the convenience and productivity may be enhanced.

Besides, since the resource can be used through the network without inquiring to the administrator of the network, setting of resource information is easy, and the required time is saved.

When using the portable personal computer by connecting to a network circuit, the resource environment substantially equivalent to the environment to be used by the user of the portable personal computer can be selected, and therefore the hitherto disliked operation of frequent connection and disconnection of the portable personal computer with the network is facilitated, and the utility is improved.

Moreover, according to the portable computer of the invention, when connected to the network, the resource information relating to the resource usable near the network is set semiautomatically or automatically, and the resources can be utilized through the network without having to inquire to the administrator of the network. Hence, the resource environment substantially equivalent to the environment to be used by the user of the portable personal computer can be selected, and therefore the hitherto disliked operation of frequent connection and disconnection of the portable personal computer with the network is facilitated, and the utility is improved.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of controlling a system, the system including:
a network circuit;
a plurality of connecting means;
a first computer fixedly connected to the network circuit; and
a second computer detachably connectable to the network circuit via any one of the plurality of connecting means, the method comprising:
managing, in the first computer, information relating to hardware or software, including a place of installation in the real world for each of the hardware or software, which are usable through the network circuit, and providing a resource information managing result;
selecting, at the second computer, one of the managed information relating to the plural sets of hardware or software, set by a user; and
acquiring, in the first computer, the hardware information or software information of the resource information managing result in response to a request for information relating to usable hardware or software from another computer, transmitting the acquired hardware information or software information from the first computer to the network circuit, and providing a resource information processing result of the acquiring;
holding, in the second computer, the hardware information or software information relating to the hardware or software that can be managed directly, and providing a resource information holding result;
comparing, in the second computer, the hardware information or software information of the resource information holding result of the second computer and the hardware information or software information of the resource information managing result of the first computer, and providing a comparing result;
detecting, in the second computer, a replaceable hardware or software, and providing a detecting result;
when the second computer connected to the network circuit through any one of the plurality of connecting means is detected as being disconnected from the hardware or software that can be managed directly:
comparing, in the second computer, the hardware information or software information, of the resource information managing result, transmitted from the first computer and the hardware information or software information of the resource information holding result; and
directly setting, in the second computer, the replaceable hardware or software.

2. The method as set forth in claim 1, further comprising:
operating the selected hardware or software after the selecting of the hardware or software.

3. The method as set forth in claim 2, wherein the selected hardware is a printer selected from a plurality of printers, and the operating of the selected hardware comprises performing a print job.

4. The method as set forth in claim 1, further comprising downloading said hardware or software information, and said setting comprises setting said downloaded hardware or software information.

5. A method of controlling a computer network system, the computer network system including:
a network circuit;
a first computer fixedly connected to said network circuit; and
plural connecting means provided in said network circuit and capable of connecting and disconnecting a second computer, the method comprising:
managing, in the first computer, plural sets of information relating to hardware or software, including a place of installation in the real world for each of the hardware or software, which are usable through said network circuit corresponding to plural positions;
managing, in the second computer, plural sets of information relating to the hardware or software, including a place of installation in the real world for each of the hardware or software, which are usable through said network circuit corresponding to said connecting means;
selecting, at the second computer, one of the managed information relating to plural sets of hardware or software, set by a user;
setting, in the second computer, the hardware or software according to the selected information relating to the hardware or software;
comparing, in the second computer, an updated time of the managed hardware information or software information corresponding to the connecting means and an updated time of the managed hardware information or software information corresponding to the plural positions; and
when said second computer is connected to said network circuit through any one of said plural connecting means, obtaining the managed hardware information or software information corresponding to the plural positions, and registering in the case where the comparing result shows that the updated time corresponding to the connecting means is before the updated time corresponding to the plural positions, and directly setting the hardware or software.

6. The method as set forth in claim 5, further comprising operating the selected hardware or software after the selecting of the hardware or software.

7. The method as set forth in claim 6, wherein the selected hardware is a printer selected from a plurality of printers, and the operating of the selected hardware comprises performing a print job.

8. The method as set forth in claim 5, further comprising downloading said hardware or software information, and said setting comprises setting said downloaded hardware or software information.

9. A method of controlling a computer network system, the computer network system comprising:
a network circuit;
a first computer connected to the network circuit;
a second computer;
a plurality of connecting means capable of connecting and disconnecting the second computer, the method comprising:
managing, in the second computer, plural sets of information relating to hardware or software, including a place of installation in the real world for each of the hardware or software, which are usable through said network circuit corresponding to said connecting means;
selecting, at the second computer, one of the managed information relating to plural sets of hardware or software, set by a user;
directly setting the hardware or software according to the information relating to the hardware or software corresponding to the selected position;
transmitting, in the second computer, updated hardware information or software information to the first and second computers connected to said network circuit when the managed hardware information or software information is updated; and updating, in the second computer, the hardware information or software information when receiving the updated hardware information or software information; and when said second computer is connected to said network circuit through any one of said plural connecting means, updating the hardware information or software information in the case where the updated hardware information or software information is received from the first computer.

10. The method as set forth in claim 9, further comprising operating the selected hardware or software after the selecting of the hardware or software.

11. The method as set forth in claim 10, wherein the selected hardware is a printer selected from a plurality of printers, and the operating of the selected hardware comprises performing a print job.

12. The method as set forth in claim 9, further comprising downloading said hardware or software information, and said setting comprises setting said downloaded hardware or software information.

* * * * *